United States Patent
Hirato

(10) Patent No.: US 8,330,892 B2
(45) Date of Patent: Dec. 11, 2012

(54) DISPLAY PANEL, DISPLAY DEVICE, AND METHOD FOR MANUFACTURING THE DISPLAY PANEL

(75) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 697 days.

(21) Appl. No.: 12/521,931

(22) PCT Filed: Jan. 10, 2008

(86) PCT No.: PCT/JP2008/050212
§ 371 (c)(1),
(2), (4) Date: Jul. 1, 2009

(87) PCT Pub. No.: WO2008/111322
PCT Pub. Date: Sep. 18, 2008

(65) Prior Publication Data
US 2010/0039577 A1    Feb. 18, 2010

(30) Foreign Application Priority Data

Mar. 15, 2007 (JP) ................................. 2007-067526

(51) Int. Cl.
*G02F 1/1333* (2006.01)
*G02F 1/1343* (2006.01)
(52) U.S. Cl. .............. 349/54; 349/39; 349/55; 349/143; 349/192
(58) Field of Classification Search ............. 349/54, 349/55, 139, 192, 39, 143, 187; 345/93
See application file for complete search history.

(56) References Cited

U.S. PATENT DOCUMENTS

| | | | |
|---|---|---|---|
| 5,045,753 A | 9/1991 | Katayama | |
| 5,929,947 A * | 7/1999 | Tani | ................................. 349/42 |
| 5,995,178 A * | 11/1999 | Fujikawa et al. | ............... 349/55 |
| 6,175,393 B1 | 1/2001 | Ban | |
| 6,191,832 B1 * | 2/2001 | Nakakura | ........................ 349/54 |
| 6,441,401 B1 | 8/2002 | Jung et al. | |
| 6,462,792 B1 | 10/2002 | Ban | |
| 6,577,357 B2 * | 6/2003 | Kida | ................................ 349/54 |
| 6,958,802 B2 | 10/2005 | Watamura | |
| 2005/0122305 A1 | 6/2005 | Murao | |

FOREIGN PATENT DOCUMENTS

JP       10-232412       9/1998

OTHER PUBLICATIONS

International Search Report for PCT/JP2008/050212, mailed Apr. 1, 2008.

* cited by examiner

*Primary Examiner* — Dung Nguyen
*Assistant Examiner* — Tai Duong
(74) *Attorney, Agent, or Firm* — Nixon & Vanderhye P.C.

(57) ABSTRACT

Electrical conductor patterns (20) are provided so as to face respective source lines (SL). In each of the electrical conductor patterns (20), a plurality of electrical conductor islands (21) line up. With a source line (SL) being broken at points P1 and P2, an electrical conductor island (21-*j*) is connected via point Q1*a* and Q1*b*, and an electrical conductor island (21*j*) is connected via points Q2*a* and Q2*b*, by carrying out laser welding. This realizes a display panel including spare lines for respective data signal lines, in which display panel it is possible to increase a probability that a supply failure of a data signal can be avoided, even in a case where a data signal line is broken.

12 Claims, 14 Drawing Sheets

DISPLAY PANEL, DISPLAY DEVICE, AND METHOD FOR MANUFACTURING THE DISPLAY PANEL

This application is the U.S. national phase of International Application No. PCT/JP2008/050212, filed 10 Jan. 2008, which designated the U.S. and claims priority to Japanese Patent Application No(s). 2007-067526, filed 15 Mar. 2007 the entire contents of each of which are hereby incorporated by reference.

TECHNICAL FIELD

The present invention relates to a configuration and an arrangement each being capable of carrying out driving by use of a spare line in the event of a wiring line defect in a display panel.

BACKGROUND ART

In an active matrix liquid crystal display device, in a case where a data signal line is broken during a manufacturing step, a data signal cannot be supplied to respective pixels connected with the data line on an ending side of a breaking part. In view of this, a liquid crystal display device is proposed in which a spare line to a data signal line is provided so that even in the case of such breaking of a data signal line, there will be no pixel to which a data signal cannot be supplied.

FIG. 7 shows a partial configuration of a liquid crystal display panel including such a spare wire, which liquid crystal display panel is disclosed in a Patent Literature 1.

In FIG. 7, plural scanning signal lines 106 and data signal lines 105 intersect each other, and a region surrounded by adjacent scanning signal lines 106, 106 and adjacent data signal lines 105, 105 is one pixel region. Provided in each pixel is a TFT 108 that (i) electrically connects a data signal line 105 and a pixel electrode 107 and (ii) electrically disconnecting the data signal line 105 and the pixel electrode 107 from one another. Also, a storage capacitance electrode, which constitutes a storage capacitor together with a storage capacitor line 113 provided in parallel with a scanning signal line 106, is provided in each pixel. The TFT 108 includes a drain electrode connected with a pixel electrode 107 via a connection electrode 125, which includes the storage capacitance electrode, and a contact hole 127. Further, a spare line 115 is provided laterally to and in parallel with each data signal line 105. The spare line 115 is connected with the data signal line 105 via a link line 116 in each pixel (the description deals with a configuration shown in a left part of the drawing, in which configuration the data signal line and the spare line are connected with each other in a ladder manner).

Provision of the spare line 115 makes it possible that, even in a case where a part of a data signal line 105 breaks, a data signal outputted from a data signal line driving section be supplied to pixels connected with the data signal line at a terminal end.

Furthermore, a Patent Literature 2 discloses a configuration in which a spare line is provided in parallel with a data signal line, and those lines are connected with each other in every pixel.

Patent Literature 1
Japanese Patent Application Publication, Tokukai, No. 2005-165048 A (Publication Date: Jun. 23, 2005)
Patent Literature 2
Japanese Patent Application Publication, Tokukaihei, No. 9-90318 A (Publication Date: Apr. 4, 1997)

SUMMARY OF INVENTION

The Patent Literatures 1 and 2 disclose the configurations, respectively, in each of which spare lines are provided for respective data signal lines, and each spare line and each data signal line, which constitute a pair, are connected with each other. However, the spare lines are provided next to the respective data signal lines. As such, in a case where a data signal line is broken at an arbitrary point, it is more likely that corresponding one the spare lines is broken at a part close to the part where the data signal line is broken.

As is clear in FIG. 7, in each of the configurations disclosed by the Patent Literatures 1 and 2, the spare lines are provided away from the respective data signal lines only by half a distance of a pixel pitch in a direction in which a scanning signal line extends. As such, if a foreign matter is got mixed during a photolithography step in which the data signal lines are patterned, it is more likely that the foreign matter has a size that goes over a data signal line and a spare line. In a case where this causes etching masks of the respective wiring lines to have a defect, etching is carried out to regions which should be left in an etching process, thereby causing, as shown in FIG. 8, a data signal line 105 and a spare line 115 to be broken at points X and Y which are substantially closest to each other.

In a case where the data signal line and the spare line are broken at parts substantially facing each other, at a same time, a data signal cannot be supplied toward a part of the data signal line on the ending side of a breaking part.

As described, a conventional spare line is prepared for a case where the data signal line breaks, and formed by patterning the spare line, which is provided next to the data signal line, at a same time as patterning the data signal line. As such, there is a problem in (i) that a probability that a part of the spare line for bypassing the breaking part of the data signal line breaks at the same time as the data signal line breaks is high, and thereby (ii) that a probability that a supply failure of a data signal can be avoided is low.

The present invention is made in view of the problem, and an object of the present invention is to realize a display panel, a display device, and a method for manufacturing the display panel, in each of which a spare line is provided for a data signal line, and even in a case where breaking of a data signal line is occurred, a supply failure of a data signal is more likely to be avoided.

In order to attain the object, the display panel of the present invention is configured so as to be an active matrix display panel, which includes electrical conductor patterns in each of which a plurality of electrical conductor islands are provided so as to line up, each of the plurality electrical conductor islands partially or entirely facing corresponding one of data signal lines in its film thickness direction, the electrical conductor patterns being provided for the respective data signal lines and being different from a pattern of electrodes of display elements to which respective data signals are supplied.

According to the invention, in a case where a data signal lines is broken, a corresponding electrical conductor pattern is used as a spare line, so that an electrical conductor island, which faces the data signal line on both sides of a breaking part, is connected with the data signal line by carrying out welding or the like. This repairs the breaking of the data signal line, thereby making it possible that data signals are normally supplied to all the pixels. Further, because the electrical conductor patterns are patterned in a process step different from a process step in which data signal lines are patterned, a probability that the electrical conductor patterns are broken at respective parts facing breaking parts of the corresponding data signal lines is low.

Therefore, the invention brings about an effect that realizes the display panel including spare lines for respective data signal lines, in which display panel it is possible to increase a probability that a supply failure of the data signal can be avoided, even in a case where the data signal lines are broken.

Furthermore, because each of the electrical conductor patterns and corresponding one of the data signal lines are provided so as to be connected with same pixels, these wiring lines can have a same electrical potential. In view of this, the invention brings about another effect that makes it possible that even in a case where a leakage between such wiring lines is occurred, the leakage causes no influence on electrical potentials of pixels connected with other ones of the data signal lines.

Furthermore, because the electrical conductor patterns partially faces the respective data signal lines in their film thickness direction, the invention brings about an effect that makes it possible that an aperture rate of each pixel be kept from being reduced despite provision of spare lines.

In order to attain the object, the display panel of the present invention is configured such that each of the plurality of electrical conductor islands has a length in a direction in which a pixel column extends, the pixel column being constituted by pixels each connected with a same data signal line, the length being smaller than or equal to a length of one pixel in the direction.

According to the invention, the length of each electrical conductor island in the direction in which the pixel column extends is small, thereby causing increase in a charging capacitance to be small, the increase being to be brought about in a case where the electrical conductor islands are connected with the corresponding one of the data signal lines. Thus, the invention brings about an effect that makes it possible to prevent increase in a load capacitance to a power supply of the data signals.

In order to attain the object, the display panel of the present invention is configured such that, in each of the electrical conductor patterns, (i) a gap between adjacent ones of the plurality of electrical conductor islands and (ii) a connecting part of the corresponding one of data signal lines and a corresponding pixel selection element face each other.

According to the invention, the electrical conductor islands are provided so as to face respective parts of the corresponding one of the data signal lines, each of the parts being between two adjacent ones of pixel selection elements along the direction in which the pixel column extends. Thus, the invention brings about an effect that makes it possible that even in a case where a data signal line is broken at several points in such a part, the data signal be normally supplied to all the pixels simply by connecting corresponding one of the electrical conductor island with the data signal line via both ends of the electrical conductor island.

Furthermore, the electrical conductor islands have a length in the direction in which the pixel column extends, the length being as small as a length of one pixel in the direction. As such, increase in a charging capacitance, the increase to be brought about in a case where the electrical conductor islands are connected with the corresponding one of the data signal lines, is small. Thus, the invention brings about an effect that makes it possible to prevent increase in a load capacitance to the power supply of the data signals.

In order to attain the object, the display panel of the present invention is configured such that an electrical conductor island in each one of the electrical conductor patterns goes over each one of intersections of the data signal lines and scanning signal lines, and the electrical conductor island in each one of the electrical conductor patterns partially faces both sides of corresponding one of the data signal lines, the each one of intersections being sandwiched between the both sides.

The invention brings about an effect that makes it possible that even in a case where a data signal line is broken at a step formed above such an intersection, breaking of the data signal line be repaired by welding the corresponding one of the electrical conductor islands with the data signal line on both sides of a braking part. Further, it is possible that breaking of the data signal line occurred above or near the intersection be repaired by welding the corresponding one of the electrical conductor islands with the data signal line in a region other than the intersection. Thus, the invention brings about an effect that makes it possible to avoid a case where a repair in the intersection causes generation of a leakage between the data signal line and a corresponding scanning signal line.

In order to attain the object, the display panel of the present invention is configured so as to further include a storage capacitance lines so that storage capacitance is provided for respective pixels, the storage capacitance lines being provided so as to intersect with the respective data signal lines, an electrical conductor island in each one of the electrical conductor patterns going over each one of intersections of the data signal lines and the storage capacitance lines, and the electrical conductor island in each one of the electrical conductor patterns partially facing both sides of corresponding one of the data signal lines, the each one of intersections being sandwiched between the both sides.

The invention brings about an effect that makes it possible that even in a case where a data signal line is broken at a step formed above such an intersection, breaking of the data signal line be repaired by welding the corresponding one of the electrical conductor islands with the data signal line on both sides of a breaking part. Further, it is possible that breaking of the data signal line occurred above or near the intersection be repaired by welding the corresponding one of the electrical conductor islands with the data signal line in a region other than the intersection. Thus, the invention brings about an effect that makes it possible to avoid a case where a repair in the intersection causes generation of a leakage between the data signal line and a corresponding storage capacitance line.

In order to attain the object, the display panel of the present invention is configured such that each one of the electrical conductor patterns includes an electrical conductor island which is connected with corresponding one of the data signal lines via a plurality of connecting parts, the corresponding one of the data signal lines being broken between adjacent ones of the plurality of connecting parts.

According to the present invention, there is the electrical conductor island which is connected with the corresponding one of the data signal lines via the plurality of connecting parts. Thus, the invention brings about an effect that makes it possible to normally supply the data signal.

In order to attain the object, the display panel of the present invention is configured such that more than one of the plurality of electrical conductor islands are provided in a direction in which a pixel column extends, so as to line up within a distance corresponding to a length of one pixel in the direction, the pixel column being constituted by pixels each connected with a same data signal line.

According to the invention, each electrical conductor islands is small. As such, even in a case where a leakage between some of the electrical conductor islands, which are not used in repairing breaking of the data signal line, and a corresponding one of the data signal lines is caused due to production of a metal residue, electrical charging of such electrical conductor islands by the leakage can be less significant. Further, because others of the electrical conductor islands, which are used in repairing the breaking of the data signal line, are also small and normally limited in number, there is hardly any increase in a load capacitance by such a leakage. Thus, the invention brings about an effect that makes it possible to remarkably reduce increase in the load capacitance despite provision of the electrical conductor islands.

In order to attain the object, the display panel of the present invention is configured such that, in each of the electrical conductor patterns, an electrode pattern of an adjacent display element extends from a side of the display element to a gap between adjacent ones of the plurality of electrical conductor islands.

According to the present invention, in a case where the display panel is observed from a backside, extending parts of an electrode of the display element to adjacent one of the data signal lines are checked. Thus, the invention brings about an effect that shows where the electrical conductor patterns behind the respective data signal lines are.

In order to attain the object, the display panel of the present invention is configured such that an electrical conductor island in each one of the electrical conductor patterns goes over a scanning signal line in a region where the electrical conductor island does not face corresponding one of the data signal lines, and the electrical conductor island partially faces both sides of the corresponding one of the data signal lines, the scanning signal line being sandwiched by the both sides.

The invention brings about an effect that makes it possible to repair breaking of a data signal line above or near an intersection of the data signal line and a corresponding scanning signal line, and another effect that makes is possible that even in a case where a leakage between the data signal line and the corresponding scanning signal line is occurred in the intersection, the leakage be solved by carrying out (i) melting down and thereby cutting the data signal line on both sides of a leakage part or (ii) the like.

In order to attain the object, the display panel of the present invention is configured so as to further include storage capacitance lines so that storage capacitance is provided for respective pixels, the storage capacitance lines being provided so as to intersect with the respective data signal lines, an electrical conductor island in each one of the electrical conductor patterns going over corresponding one of the storage capacitance lines in a region where the electrical conductor island in each one of the electrical conductor patterns does not face corresponding one of the data signal lines, and the electrical conductor island in each one of the electrical conductor patterns partially facing both sides of the corresponding one of the data signal lines, the corresponding one of the storage capacitance lines being sandwiched by both sides.

The invention brings about an effect that makes it possible to repair breaking of a data signal line above or near an intersection of the data signal line and a corresponding storage capacitance line, and another effect that makes is possible that even in a case where a leakage between the data signal line and the corresponding storage capacitance line is occurred in the intersection, the leakage be solved by carrying out (i) melting and thereby cutting the data signal line on both sides of a leakage part or (ii) the like.

In order to attain the object, the display panel of the present invention is configured such that a ring shaped electrical conductor pattern in each one of the electrical conductor patterns surrounds each one of intersections of the data signal lines and scanning signal lines.

The invention brings about (i) an effect that makes it possible that breaking of the data signal line be repaired above or near the intersection of the data signal line and the scanning signal line, (ii) another effect that makes it possible that even in a case where a leakage between the data signal line and the scanning signal line is occurred at the intersection, the leakage be solved by performing (a) melting down and thereby cutting the data signal line on both sides of a leakage part or (b) the like, and (iii) a further effect that makes it possible that breaking of the scanning signal line occurred near the intersection be repaired by use of the ring shaped electrical conductor islands.

In order to attain the object, the display panel of the present invention is configured so as to further include storage capacitance lines so that storage capacitance is provided for respective pixels, the storage capacitance lines being provided so as to intersect with the respective data signal lines, a ring shaped electrical conductor pattern in each one of the electrical conductor patterns surrounding each one of intersections of the data signal lines and the storage capacitance lines.

The invention brings about (i) an effect that makes it possible that breaking of the data signal line be repaired above or near the intersection of the data signal line and the storage capacitance line, (ii) another effect that makes it possible that even in a case where a leakage between the data signal line and the storage capacitance line is occurred at the intersection, the leakage be solved by carrying out (a) melting down and thereby cutting the data signal line on both sides of a leakage part or (b) the like, and (iii) a further effect that makes it possible that breaking of the storage capacitance line occurred near the intersection be repaired by use of the ring shaped electrical conductor islands.

In order to attain the object, the display panel of the present invention is configured so as to be an active matrix display panel, which includes electrical conductor patterns in each of which a wiring line is provided so as to partially face a corresponding one of data signal lines in its film thickness direction, the electrical conductor patterns being provided for the respective data signal lines.

According to the invention, in a case where a data signal line is broken, a corresponding one of the electrical conductor patterns is used as a spare line so as to be connected, by carrying out welding or the like, with the data signal line via a part facing the data signal line on both sides of a breaking part. This makes it possible that the data signal be normally supplied to all the pixels. Further, because the electrical conductor patterns are patterned in a process step different from a process step in which data signal lines are patterned, a probability that an electrical conductor pattern is broken at a part facing a breaking part of corresponding one of the data signal lines is low.

Therefore, the invention brings about an effect that makes it possible to realize the display panel including spare lines for respective data signal lines, in which display panel it is possible to increase a probability that a supply failure of the data signal can be avoided, even in a case where a data signal line is broken.

Further, because each of the electrical conductor patterns and corresponding one of the data signal lines are provided so as to be connected with same pixels, such wiring lines can have a same electrical potential. In view of this, the invention brings about an effect that makes it possible that even in a case where a leakage between such wiring lines is occurred, the leakage causes no influence on an electrical potential of pixels connected with other ones of the data signal lines.

Furthermore, the electrical conductor patterns partially face the respective data signal lines in their film thickness directions. Thus, the invention brings about an effect that makes it possible that an aperture rate of pixels be kept from being reduced despite provision of the spare lines.

In order to attain the object, the display panel of the present invention is configured such that each one of the electrical conductor patterns includes an electrical conductor patterns which is connected with corresponding one of the data signal line via a plurality of connecting parts, the corresponding one of the data signal lines being broken between adjacent ones of the plurality of connecting parts.

According to the invention, a data signal line and corresponding one of the electrical conductor patterns are connected with each other via a plurality of connecting parts, the data signal line being broken between adjacent ones of the plurality of the connecting parts. Thus, the invention brings about an effect that makes it possible to normally supply the data signal.

In order to attain the object, the display panel of the present invention is configured such that each of the plurality of electrical conductor patterns goes over a scanning signal line in a region where the each of the plurality of electrical conductor patterns does not face the corresponding one of the data signal lines, and the each of the plurality of electrical conductor patterns partially faces both sides of the corresponding one of the data signal lines, the scanning signal line being sandwiched by the both sides.

The invention brings about (i) an effect that makes it possible to repair breaking of a data signal line above or near an intersection of the data signal line and a corresponding scanning signal line, and (ii) another effect that makes it possible that even in a case where a leakage between the data signal line and the corresponding scanning signal line is occurred at the intersection, the leakage be solved by carrying out (i) melting down and thereby cutting the data signal line on both sides of a leakage part (ii) or the like.

In order to attain the object, the display panel of the present invention is configured so as to further include storage capacitance lines so that storage capacitance is provided for respective pixels, the storage capacitance lines being provided so as to intersect with the respective data signal lines, each of the plurality of electrical conductor patterns going over corresponding one of the storage capacitance lines in a region where the each of the plurality of electrical conductor patterns does not face corresponding one of the data signal lines, and the each of the plurality of electrical conductor patterns partially facing both sides of the corresponding one of the data signal lines, the corresponding one of the storage capacitance lines being sandwiched by the both sides.

The invention brings about (i) an effect that makes it possible to repair breaking of a data signal line above or near an intersection of the data signal line and a corresponding storage capacitance line, and (ii) another effect that makes it possible that even in a case where a leakage between the data signal line and the corresponding storage capacitance line is occurred at the intersection, the leakage be solved by carrying out (i) melting down and thereby cutting the data signal line on both sides of a leakage part (ii) or the like.

In order to attain the object, the display panel of the present invention is configured such that each of the electrical conductor patterns is made by a transparent electrode.

The invention brings about an effect that makes it easier to observe a breaking part of a data signal line from above corresponding one of the electrical conductor patterns. Besides, the invention brings about an effect that is useful in a case where blocking of a transmission light is undesired, e.g., in a case where it is intended to prevent an unintended reflection in a space facing a data signal line.

In order to attain the object, the display device of the present invention is configured so as to include the display panel.

The invention brings about an effect that makes it possible, by configuring the display device including the display panel, that a display device including the display panel that has less pixel illumination failure be manufactured with a high yield rate.

In order to attain the object, the method of the present invention for manufacturing a display panel is arranged so as to a method for manufacturing the display panel, which method includes the step of forming the electrical conductor patterns from a same material as the electrodes of the display elements to which the respective data signals are supplied, by concurrently patterning the electrical conductor patterns and the electrodes of the display elements.

The invention brings about an effect that avoids making a process complex despite provision of the electrical conductor patterns.

In order to attain the object, the method of the present invention is arranged such that the display panel is a liquid crystal display panel, and the electrodes are pixel electrodes.

The invention brings about an effect that avoids making a process complex despite provision of the electrical conductor patterns, in a liquid crystal display panel.

In order to attain the object, the method of the present invention is arranged so as to further include the step of forming a path that causes the data signals to be supplied via the respective electrical conductor patterns, by carrying out laser welding so that the electrical conductor patterns are connected to the respective data signal lines.

The invention brings about an effect that makes it possible a path, which causes the data signals to be supplied via the respective electrical conductor patterns, be formed by use of a conventional laser welding method with ease.

For a fuller understanding of the nature and advantages of the invention, reference should be made to the ensuing detailed description taken in conjunction with the accompanying drawings.

BRIEF DESCRIPTION OF REFERENCE NUMERALS

1. Display panel
20. Electrical conductor pattern
21. Electrical conductor island
SL1-SLn. Source line (data signal line)
GL1-GLm. Gate line (scanning signal line)
CSL. Storage capacitance line
PIX. Pixel Description of Embodiment One embodiment of the present invention is described below with reference to FIGS. 1 through 6 and 9 through 14.

Figure 4:
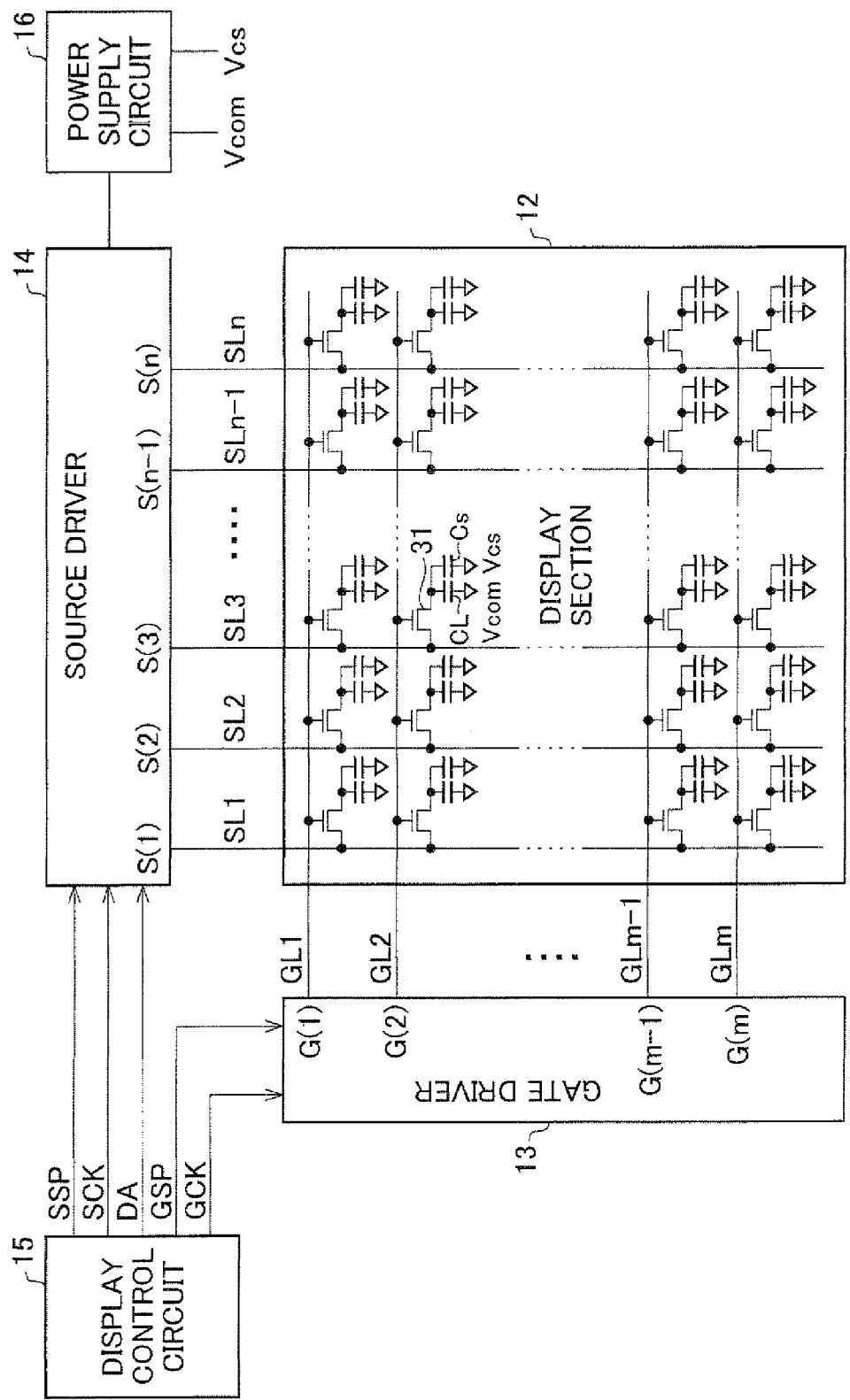
FIG. 4 is a circuit block diagram of the embodiment of the present invention, showing a configuration of the display panel.

FIG. 4 shows a configuration of a display panel 1 of a liquid crystal display device (display device) in accordance with the present embodiment.

The display panel 1 is an active matrix display panel, and includes (i) a gate driver 13 as a scanning signal line driving circuit, (ii) a source driver 14 as a data signal line driving circuit, (iii) a display section 12, (iv) a display control circuit 15 for controlling the gate driver 13 and the source driver 14, (v) and a power supply circuit 16.

The display section 12 includes (i) a plurality of (m number of) gate lines GL1 through GLm as scanning signal lines, (ii) a plurality of (n number of) source lines SL1 through SLn as data signal lines, the source lines SL1 through SLn and the gate lines GL1 through GLm intersecting each other, and (iii) a plurality of (m×n number of) pixels that are provided for intersections of the gate lines GL1 through GLm and the source lines SL1 through SLn, respectively. Further, though the drawing does not illustrate, the display section 12 includes storage capacitance lines SCL in parallel with the gate lines GL1 through GLm, respectively, each of which storage capacitance lines CSL is provided for a pixel column constituted by n number of pixels lining up in parallel with corresponding one of the gate signal lines GL1 through GLm (see FIG. 1 which is described later).

Though the drawing does not illustrate, the display section 12 includes electrical conductor patterns (spare lines) 20, each being provided so as to face corresponding one the source lines SL1 through SLn in a film thickness direction. Each of the electrical conductor patterns 20 is a pattern in which a plurality of electrical conductor islands 21, being isolated and having an island shape, are provided so as to line up along the source line SLi. A configuration of the electrical conductor islands 21 is described later with reference to FIG. 1.

A plurality of the pixels is provided in a matrix manner, and thereby constitutes pixel array. Each pixel includes a TFT (pixel selection element) 31, and for each pixel, a liquid crystal capacitance CL and a storage capacitance Cs are provided. The TFT 31 includes a gate terminal connected with a gate line GLj, a source terminal connected with a source line SLi, and a drain terminal connected with a pixel electrode.

The liquid crystal capacitor CL is constituted by the pixel electrode, a common electrode, and a liquid crystal layer sandwiched by the pixel electrode and the counter electrode. The counter electrode is applied with a voltage Vcom supplied from the power supply circuit 16. The storage capacitor Cs is constituted by a storage capacitance electrode connected with the pixel electrode, a storage capacitance line CSL, and an insulating film sandwiched by the storage capacitance electrode and the storage capacitance line CSL. The storage capacitance line CSL is applied with a voltage Vcs supplied from the power supply circuit 16. The voltage Vcs may have a same value as the voltage Vcom.

The display control circuit 15 receives, from an external signal source, signals such as a digital video signal indicative of an image to be displayed, a horizontal synchronization signal, a vertical synchronization signal, and the like. Based on such signals, the display control circuit 15 generates and outputs a gate start pulse GSP, a gate clock GCK, a source start pulse SSP, a source clock SCK, and a digital video signal DA, and the like.

Based on the gate start pulse GSP and the gate clock GCK supplied from the display control circuit 15, the gate driver 13 generates scanning signals G(1) though G(m) for sequentially scanning the gate lines GL1 through GLm for a horizontal period.

The source driver 14 generates data signals S(1) through S(n) in accordance with the source start pulse SSP, the source clock SCK, and the digital video signal DA supplied from the display control circuit 15, each of the data signal S(1) through S(n) being line sequentially supplied to corresponding one of the source lines SL1 through SLn for a synchronization period. Only the source driver 14 is connected, as the source driver, with one ends of the source lines SL1 through SLn. The preset embodiment raises, as the source driver 14, a digital driver that D/A converts digital video signals, and line sequentially supplies the thus converted signals to the source lines SL1 through SLn, respectively. However, the source driver 14 is not limited to this. Alternatively, the source driver 14 can be realized by an arbitrary driver such as an analog driver that samples analog video signals and then dot sequentially supplies the signals to the source lines SL1 through SLn, respectively, or the like.

When the gate lines GL1 through GLm are sequentially scanned by the gate line driver 13, a data signal S(i) is written in to pixels constituting a scanned pixel column, via a corresponding source line and a TFT 31. The liquid crystal capacitor CL is applied with a difference voltage between a voltage of the written data signal S(i) and the voltage Vcom of the counter electrode, and the pixels carries out display at a brightness corresponding to the applied difference voltage.

The following raises Examples so as to explain configurations of the pixel.

EXAMPLE 1

Figure 1:
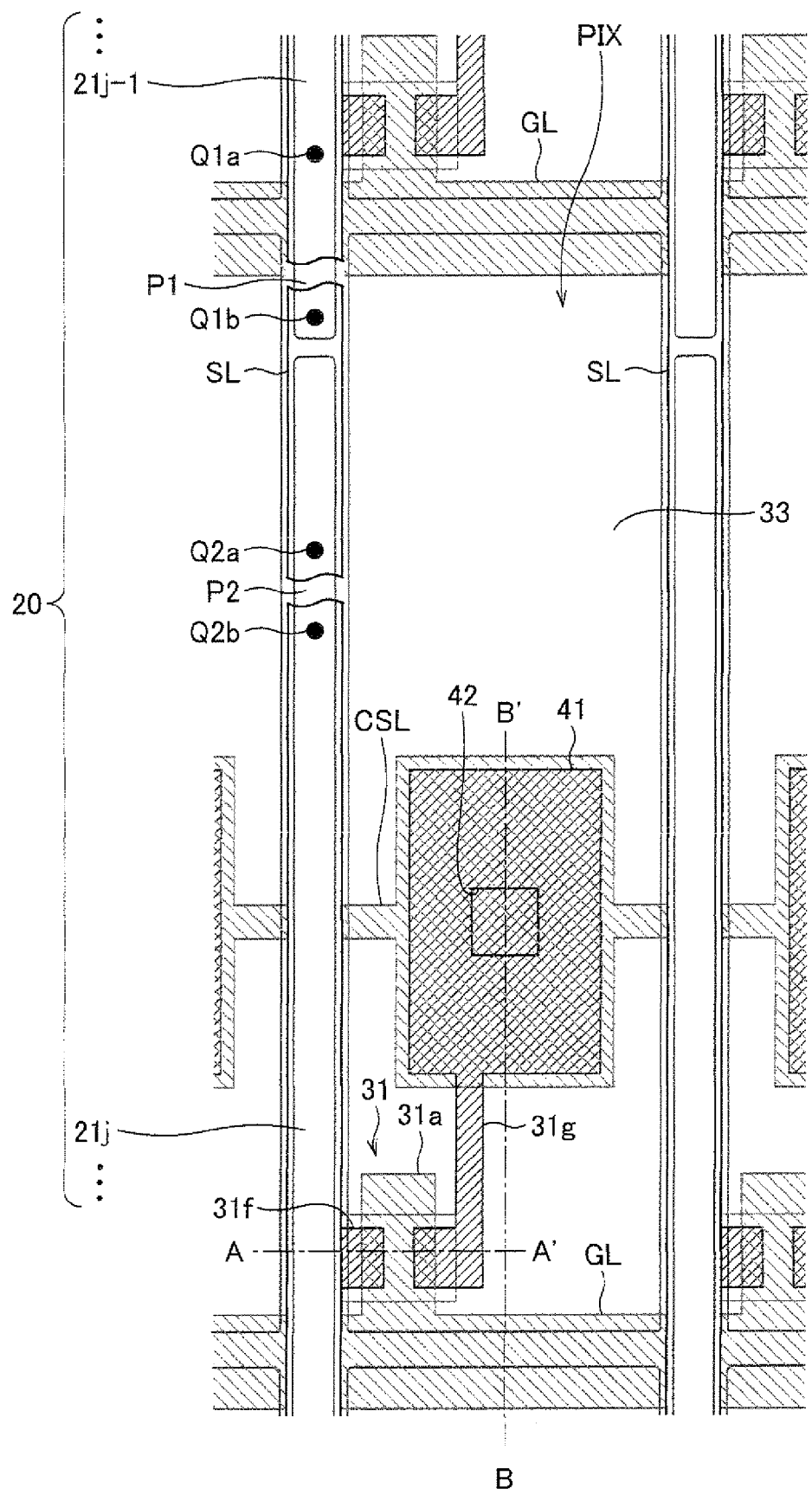
FIG. 1 is a plane view of an embodiment of the present invention, showing a first configuration of a pixel of a display panel.

FIG. 1 is a plane view of the pixel in accordance with a present example.

A configuration in FIG. 1 is a laminate structure provided on an array substrate, and includes gate lines GL1 though GLm, source lines SL1 through SLn, storage capacitance lines CSL, electrical conductor patterns 20, TFTs 31, pixel electrodes 33, and storage capacitance counter electrodes 41. A region surrounded by two adjacent ones of the gate lines GL1 through GLm and two adjacent ones of the source lines SL1 through SLn is a region of one pixel PIX.

Each of the electrical conductor patterns 20 is constituted by a plurality of electrical conductor islands 21. The electrical conductor islands 21 are provided so as to face a source line SL in their film thickness directions and to line up at least in a direction in which a data signal lines extends. Each of the electrical conductor islands 21 has a length along a direction in which a pixel column, being constituted by pixels PIX each connected with the same source line SL, extends, which length is substantially a same as a length of one pixel in the direction, i.e., a direction in which the source line SL extends (hereinafter, referred to as a lengthwise direction). FIG. 1 shows electrical conductor islands $21j-1$ and $21j$ in the display section 12, the electrical conductor island $21j-1$ being a j−1st electrical conductor island 21 from the source driver 14, and the electrical conductor island $21j$ being a jth electrical conductor island 21 from the source driver 14. Each of the electrical conductor islands 21 goes over an intersection of the source line SL and a gate line GL, along the direction in which the source line SL extends. The electrical conductor island $21j$ has a length that extends, from slightly off a gate line GLn−1 to slightly beyond a gate line GLj, along the source line SL. Further, each of the electrical conductor islands 21 goes over an intersection of the source line SL and a storage capacitance line CSL, along the direction in which the source line SL extends.

Figure 5:
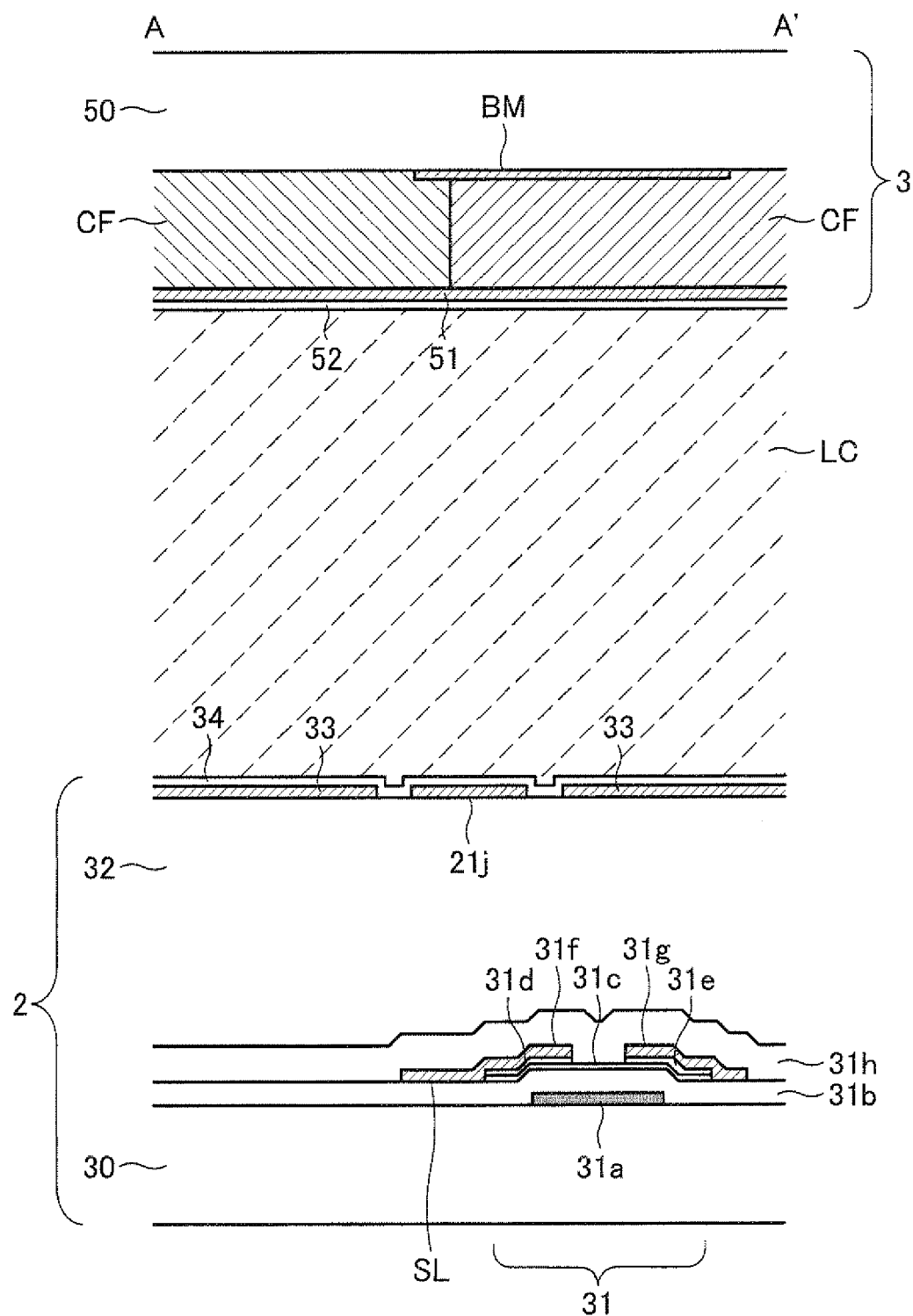
FIG. 5 is a cross sectional view of the pixel, taken on a line A-A' in FIG. 1.

FIG. 5 is a cross sectional view taken on a line A-A' in FIG. 1, the line A-A' cutting through, along a channel lengthwise direction, a region in which a TFT 31, a source line SL, and the electrical conductor island $21j$ are provided.

In FIG. 5, an array substrate 2 is constituted by a glass substrate 30 and members each being sequentially provided on or above the glass substrate 30, which members include (i) a TFT 31, (ii) an interlayer insulating film 31 made by polyimide or an acrylic resin, (iii) pixel electrodes 33 and the electrical conductor island $21j$, each being constituted by a transparent electrode 33 made by a material such as ITO or the like, and (iv) an alignment film 34 made by a material such as polyimide or the like. The TFT 31 is constituted by members each being sequentially provided on or above the glass substrate 30, which members include (i) a gate electrode $31a$ made by a material such as an Al/Ti laminated film or Cr, (ii) an insulting film $31b$ made by a material such as silicon nitride or oxide silicon, (iii) a semiconductor layer $31c$ made by amorphous silicon, (iv) a contact layer $31d$ made by n+ silicon that forms a source region, and a contact layer $31e$ made by n+ silicon that forms a drain region, (v) a source electrode $31f$ and a drain electrode $31g$, each being made by an Al/Ti laminated film, and (vi) a protection film $31h$ made by silicon nitride.

The gate electrode $31a$ is made by a same material as a gate line GL, and has a pattern connected with the gate line GL. The source electrode $31f$ and the drain electrode $31g$ are made by a same material as a source line SL, and formed concurrently with the source line SL. The source electrode $31f$ has a pattern connected with the source line SL. The drain electrode $31g$ is connected with a storage capacitance counter electrode 41 described later. The source line SL is provided on the insulating film $31b$. The electrical conductor island $21j$ is made by a same material as the pixel electrode 33 by concurrently patterning the electrical conductor island $21j$ and the pixel electrode 33.

Furthermore, in FIG. 5, a counter substrate 3 is configured in a well known manner, and is constituted by a glass substrate 50 and members each being sequentially provided on or above the glass substrate 50, which members include (i) a black matrix BM, (ii) a color filter CF, (iii) a counter electrode 51, and (iv) an alignment film 52. The array substrate 2 and the counter substrate 3 face each other via the alignment films 34 and 52) and a liquid crystal layer CL is provided therebetween.

Figure 6:
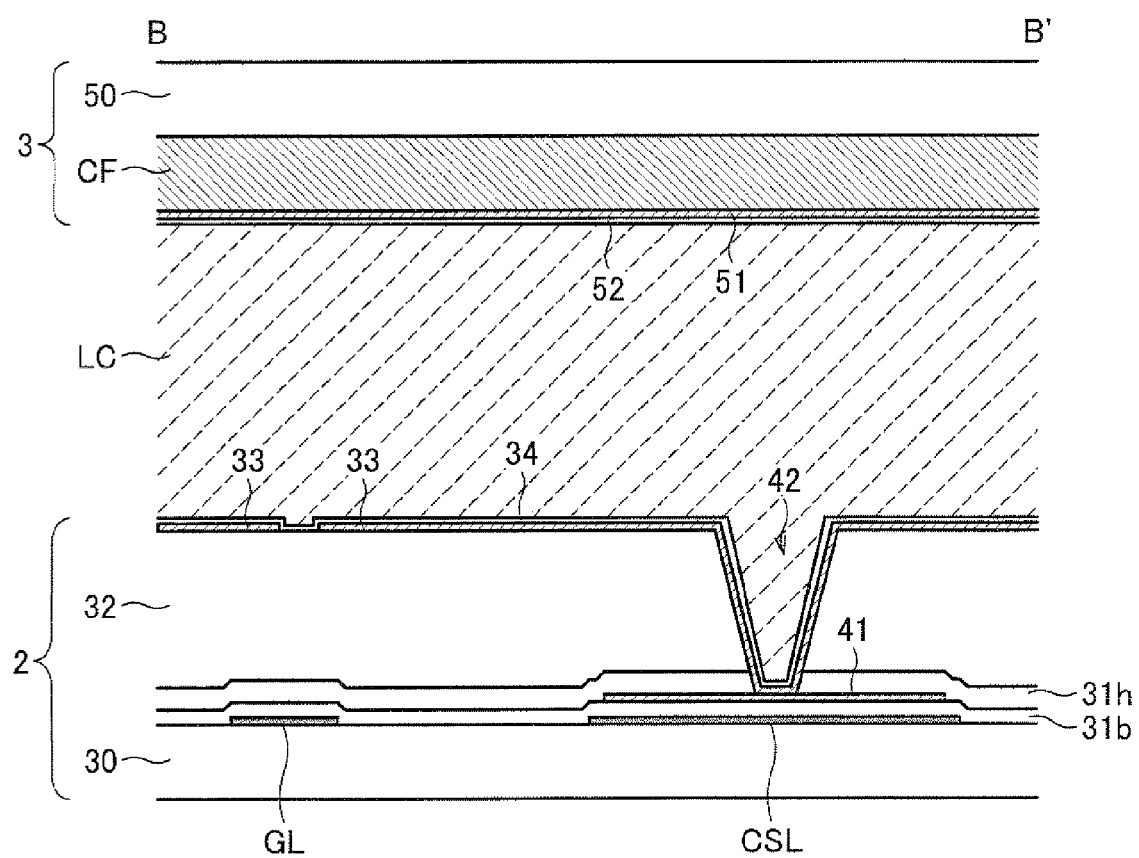
FIG. 6 is a cross sectional view of the pixel, taken on a line B-B' in FIG. 1.
Figure 7:
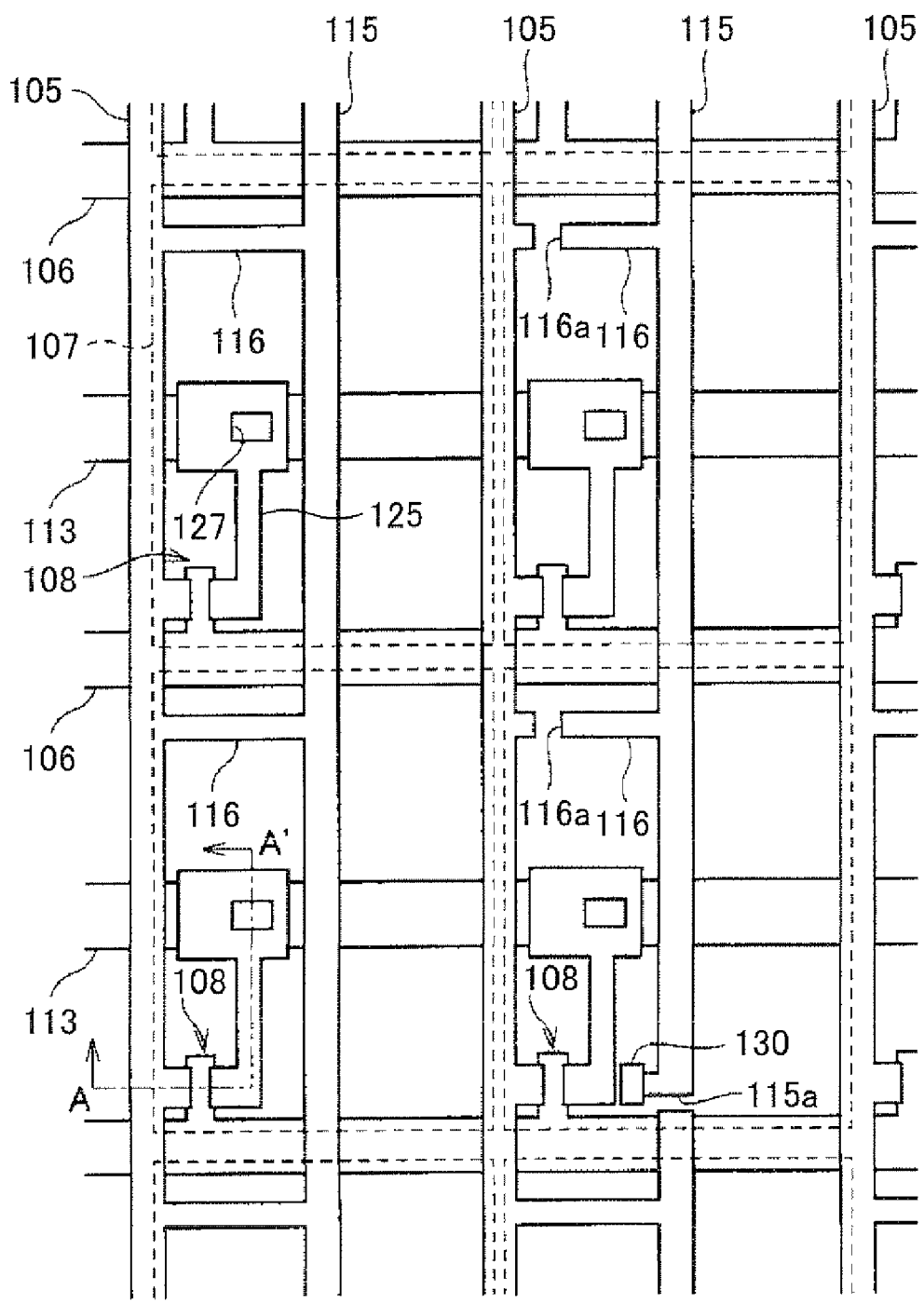
FIG. 7 is a plane view of a conventional art, showing a configuration of a pixel of a display panel.
Figure 8:
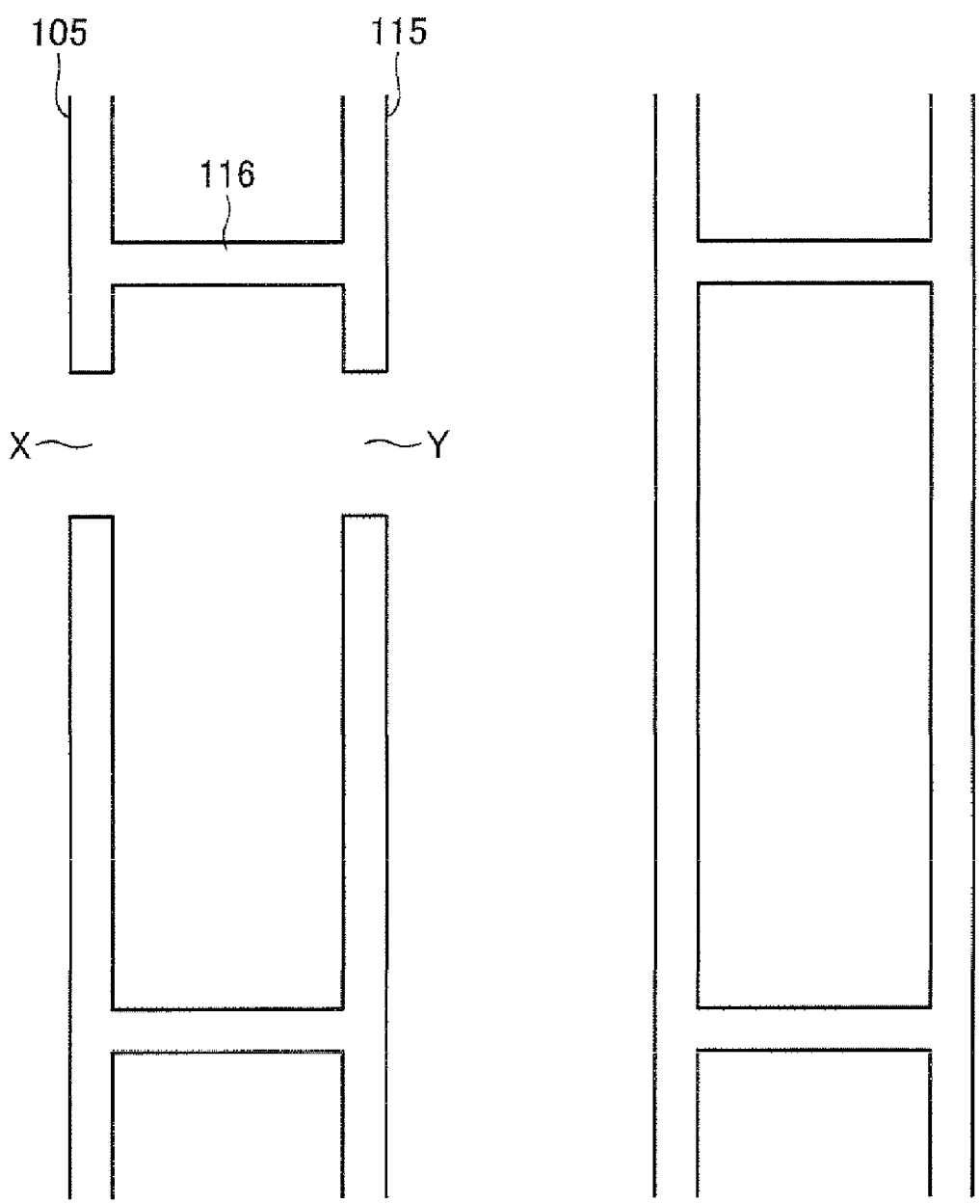
FIG. 8 is a plane view showing breaking of a data signal line and that of a spare line in a conventional display panel.

Next, FIG. 6 is a cross sectional view taken on a line B-B' in FIG. 1, the line B-B' cutting through a region where a gate line GL and the storage capacitance counter electrode 41 are provided, along a direction in parallel with the source line SL.

In FIG. 6, the array substrate 2 is constituted by the glass substrate 30 and member each being sequentially provided on or above the glass substrate 30, which members include (i) the gate line GL and the storage capacitance line CSL, (ii) the insulating film $31b$, (iii) the storage capacitance counter electrode 41, (iv) the protective film $31h$, (v) the interlayer insulating film 32, (vi) the pixel electrode 33, and (vii) the alignment film 34. The insulating film $31b$ and the protective film $31h$ are the same as those used in constituting the TFT 31. The storage capacitance line CSL is made by a same material as the gate line GL, and connects two-dimensionally spreading sections in respective pixels with one another in the direction of the gate line GL. The storage capacitance counter electrode 41 is made by a same material as the drain electrode 41, and provided so as to face the two-dimensionally spread sections in a film thickness direction. The interlayer insulting film 32 has contact holes 42 each reaching the storage capacitance electrode 41, and the pixel electrode 33 and the alignment film 34 are provided on and above the interlayer insulating film 32, including parts where the contact holes 42 are formed. This causes the drain electrode $31g$ of the TFT 31 to be electrically connected with the pixel electrode 33 and the storage capacitance counter electrode 41.

The counter substrate 3 and the liquid crystal layer LC in FIG. 6 are configured in same ways as in FIG. 5, respectively.

The configuration of the pixel PIX has been explained hereinabove.

In FIG. 1, in a case where a source line SL is broken at a point P1 in a step formed above an intersection of the source line SL and a corresponding gate line GL, the source line SL and the electrical conductor island $21j-1$ are laser welded to each other via two points Q1a and Q1b. The point Q1a is in a planar part that is closer to an starting end of the source line SL than the intersection is, and the point Q1b is in a planar part that is closer to the other end of the source line SL than the intersection is. The laser welding may be carried out after a breaking part of a source line SL is detected by a pattern check that is carried out after the TFT substrate 2 is manufactured, or the laser welding may be carried out after the breaking part of the source line SL is detected by a lighting check that is carried out after combining the TFT substrate 2 and the counter substrate and then filling the liquid crystal layer LC therebetween. In view of this, the laser welding can be carried out at arbitrary timing. Further, a direction in which the laser irradiation is carried out may be a direction from the glass substrate 30 of the TFT substrate 2 toward the source line SL, or may be a direction from the pixel electrode 33 toward the conductive material island $21j-1$.

By laser welding the source line SL and the electrical conductor island $21$-$j$ with each other via the points Q1a and Q1b, parts of the source line SL on respective sides of the point P1, the breaking point, are electrically connected with each other via the electrical conductor island $21$-$j$. Similarly, as shown in FIG. 1, in a case where the source line SL is broken at a point P2 in a planer part which faces the electrical conductor island $21j$ in its film thickness direction, the source line SL is laser welded with the electrical conductor island $21j$ via points Q2a and Q2b on both sides of the point P2, thereby causing respective parts of the source line SL on both sides of the point P2 to be electrically connected with each other.

As such, even in a case where the source line SL is broken along a path, the source line SL and a corresponding one of the electrical conductor islands 21 are laser welded with each other on both sides of a breaking part, so as to provide a supply path causing a data signal to be supplied via the electrical conductor pattern 20. This makes it possible to normally supply the data signal to pixels PIX connected with the source line, including a pixel PIX connected with the end of the source line SL.

Particularly, in the present example, one of the electrical conductor islands 21 is provided at such a position as to go over the intersection of the source line and the gate line GL as well as the intersection of the source line SL and the storage capacitance line CSL. This makes it possible that even in a case where the source line SL is broken at steps formed above such intersections, breaking of the source line SL be repaired by laser welding the source line SL and the one of the electrical conductor islands 21 on both sides of respective breaking parts. Further, in the case of repairing the source line SL being broken above or near such intersections, it is possible to laser weld the source line SL and the conductive material island 21 in regions other than the respective intersections, thereby making it possible to avoid a case where a leakage between the source line SL and the gate line GL or the storage capacitance line CSL is caused by carrying out the laser welding at the respective intersections. Also, each of the electrical conductor island 21 has a length in the lengthwise direction, which length is substantially the same as that of one pixel PIX in the lengthwise direction. This causes increase in a charging capacitance, the increase to be brought about when each of the electrical conductor islands 21 and the source line SL are connected with each other, to be small, thereby making it possible to prevent increase in a load capacitance to a power supply of a data signal, the increase to be brought about due to the laser welding.

A length of each electrical conductor islands 21 in the lengthwise direction is not limited to the above length, and alternatively, the length of each electrical conductor islands 21 in the lengthwise direction may be less than or equal to a length of one pixel in the lengthwise direction. Further, a length of each electrical conductor island 21 in the lengthwise direction can be greater than the length of one pixel in the lengthwise direction.

EXAMPLE 2

Figure 2:
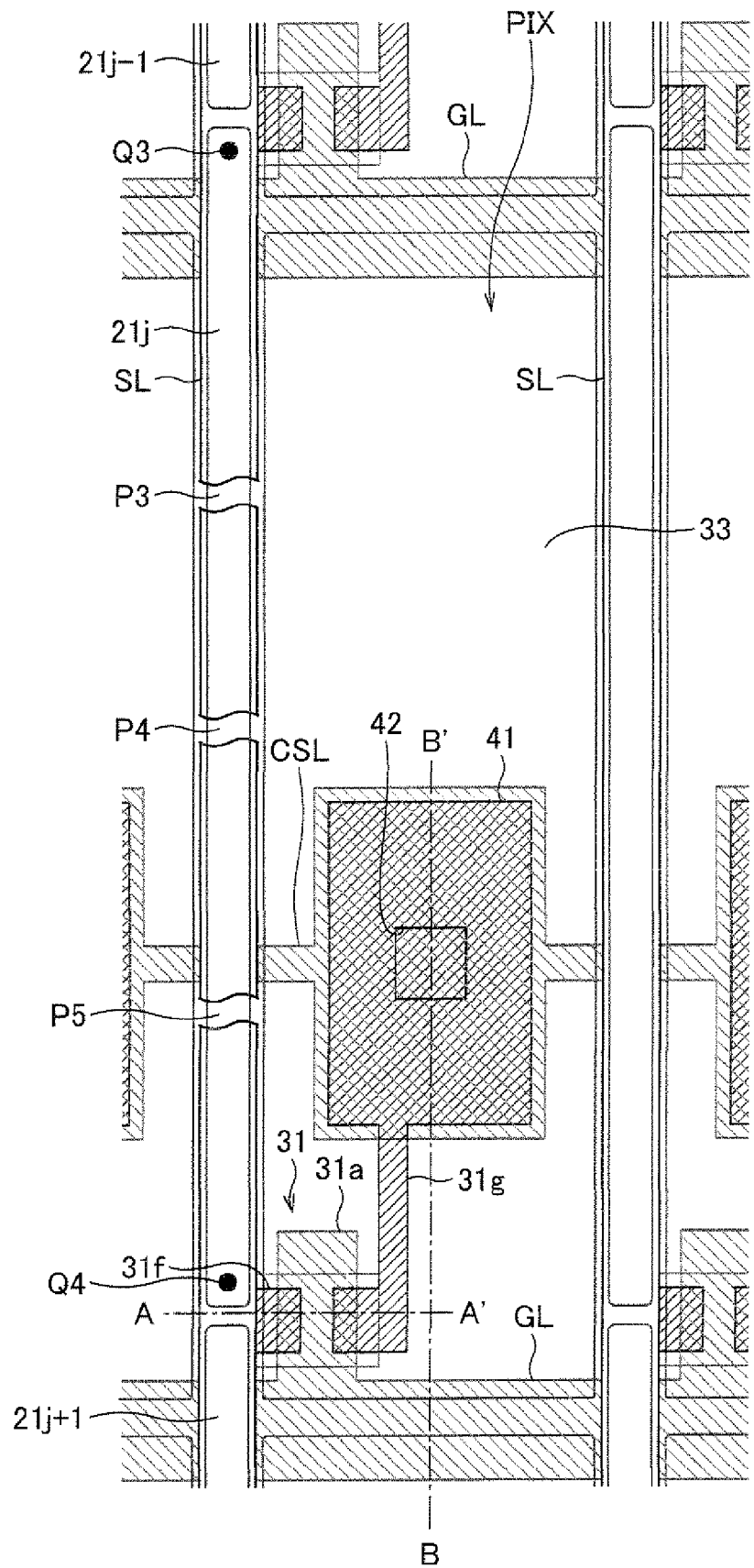
FIG. 2 is a plane view of the embodiment of the present invention, showing a second configuration of the pixel of the display panel.

FIG. 2 is a plane view of a pixel in accordance with a present example. Members given same reference numerals as in Example 1 have same functions as in Example 1 unless otherwise noted.

In an electrical conductor pattern 20 in FIG. 2, one of electrical conductor islands 21 is provided between two adjacent ones of connecting parts that connect a source line SL with respective TFTs 31 of pixels PIX lining up along a direction in which the source line SL extends, the one of electrical conductor islands 21 having a length substantially same as an interval between the two adjacent ones of connecting parts. That is, a gap between two adjacent ones of the electrical conductor islands 21 faces, in its film thickness direction, corresponding one of the connecting parts that connect the source line SL and the TFTs 31 of pixels PIX.

With a configuration as shown in FIG. 2, it is possible that even in a case where the source line SL is broken at several points, such as P3, P4, P5, and the like, in a region between adjacent ones of the connecting parts that connect the source line SL with respective TFTs 31, a data signal be supplied to all pixels PIX simply by laser welding one of electrical conductor islands 21, which faces the breaking points in its film thickness direction, with the source line SL via points Q3 and Q4 at respective ends of the one of electrical conductor islands 21 in the lengthwise direction. Further, because one of electrical conductor islands 21 is provided at such a position as to go over an intersection of the source line SL and a gate line GL as well as an intersection of the source line SL and a storage capacitance line CSL, the points Q3 and Q4 can be realized by points in regions other than the intersections, respectively. As such, in a case where breaking of the source line SL is repaired, it is possible that the source line SL and the one of electrical conductor islands 21 be laser welded with each other in parts other than the respective intersections, thereby making it possible to avoid a case where a leakage between the source line SL and the gate line GL or the storage capacitance line CSL is caused by carrying out the laser welding at the intersections.

In a display panel 1, it is difficult to recover a normal supply of a data signal in a case where any of the connecting parts of the source line SL and the TFTs 31 is broken. In the configuration shown in FIG. 2, however, the electrical conductor island 21 is laser welded with the source line SL in parts near the respective connecting parts of the source line SL and the TFTs 31. In view of this, the configuration shown in FIG. 2 is usable in display panels in each of which breaking of a wiring line is occurred in a part other than such a connecting part and thereby a recovery of a normal supply of a data signal can be expected. Further, because it is possible to keep the number parts, at which the laser welding is carried out, to two for each electrical conductor island 21, a labor of a process can be reduced. In the configuration shown in FIG. 1, in a case where the source line SL is broken on both sides of a connecting part in a region facing one conductive material island 21 in its film thickness direction, it is necessary to laser weld the one of the electrical conductor islands 21 and the source line SL at least via three parts.

EXAMPLE 3

Figure 3:
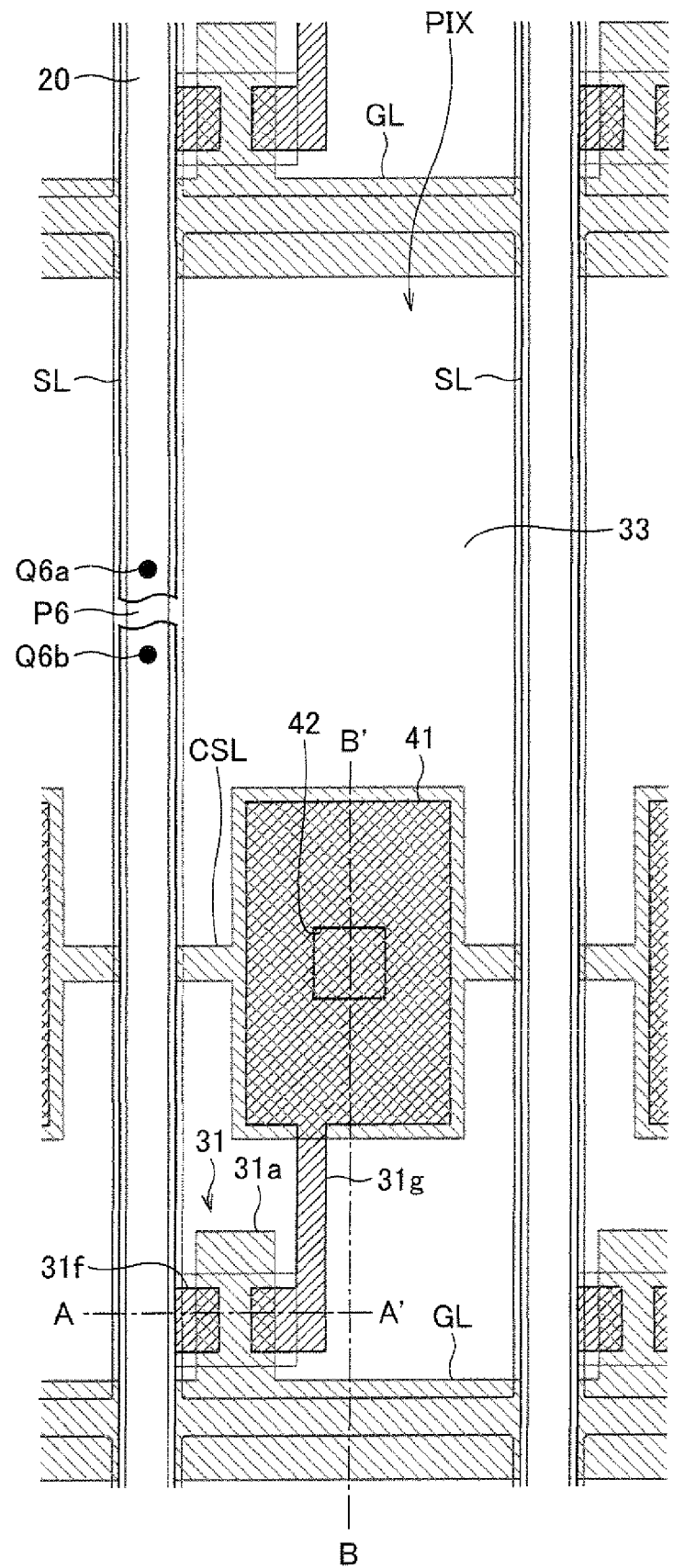
FIG. 3 is a plane view of the embodiment of the present invention, showing a third configuration of the pixel of the display panel.

FIG. 3 is a plane view of a pixel in accordance with a present example. Members given same reference numerals as in Example 1 have same functions as in Example 1 unless otherwise noted.

An electrical conductor pattern 20 in FIG. 3 is not isolated into plural electrical conductor islands 21. Instead, the electrical conductor pattern 20 is constituted by a wiring line provided for each source line SL, the wiring line being arranged so that (i) one electrical conductor is provided for each source line SL and faces it in its film thickness direction, and (ii) one electrical conductor continuously faces each source line SL at least in a direction in which the source line SL extends In this case, even when breaking of the source line SL is occurred at any arbitrary point, a normal supply of a data signal is made possible by welding the electrical conductor pattern 20 and the source line SL at points Q6a and Q6b on both sides of the breaking point such as point P6. Such a configuration (i) makes it possible to simplify patterning by reducing the number of boundaries for isolating the electrical conductor pattern 21 into plural electrical conductor islands 21, and (ii) is thereby useful, in a display panel in which increase in a load capacitance to a power supply of a data signal, the increase to be brought about when the source line SL and the electrical conductor pattern 21 are connected with each other, is not problematic, e.g., a display panel for which a high supply speed of a data signal is not necessarily required.

EXAMPLE 4

Figure 9:
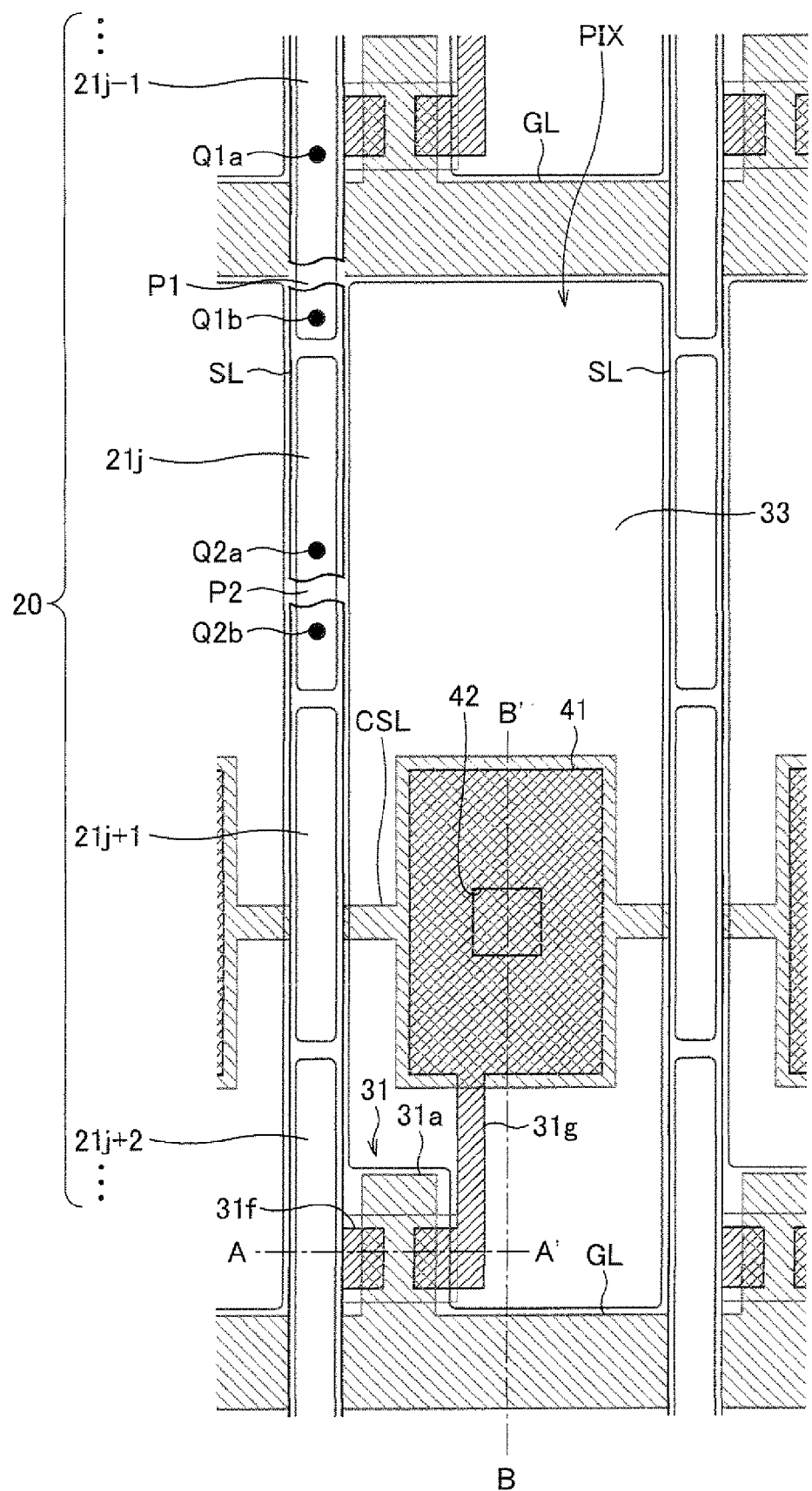
FIG. 9 is a plane view of the embodiment of the present invention, showing a fourth configuration of the pixel of the display panel.

FIG. 9 is a plane view of a pixel in accordance with a present example. Members given same reference numerals as in Example 1 have same functions as in Example 1 unless otherwise noted.

An electrical conductor pattern 20 in FIG. 9 is constituted by downsized electrical conductor islands 21, a plurality of which electrical conductor islands 21 (i) line up in a direction in which a pixel column extends and (ii) are provided for each pixel that extends along the direction. In this case, the electrical conductor pattern constituted by three electrical conductor islands 21*j*, 21*j*+1, and 21*j*+2 is provided for one pixel. Such a configuration reduces a size of the electrical conductor pattern, so that even in a case where a leakage between the source line SL and an electrical conductor island 21, which electrical conductor island 21 is not used in fixing the breaking of the source line SL, is caused by production of a metal residue, the electrical conductor island 21 is less significantly charged by the leakage. In this view, even in a case where a number of the electrical conductor islands 21, none of which is used in fixing the breaking of the source line SL, is provided, thereby posing a risk that it is more likely that a leakage is caused in any of the electrical conductor islands 21, it is still possible that increase in a load capacitance be kept remarkably small. Further, (i) electrical conductor islands 21 being used in fixing the breaking of the source line SL are also small, and usually, (ii) they are provided in the limited number, so that there is only little increase in a load capacity. Thus, the present example makes it possible to keep the increase in the load capacitance remarkably low, which increase is to be brought about by providing the electrical conductor islands 21.

Further, the present example is configured such that one of the electrical conductor islands 21 is provided at such a position so as to go over an intersection of the source line SL and a gate line GL or an intersection of the source line SL and a storage capacitance line CSL. This makes it possible that even in a case where the source line SL is broken in steps formed above such intersections, breaking of the source line SL be repaired by welding the source line and electrical conductor islands 21 on both sides of respective breaking part. Also, the above configuration makes it possible to weld the source line SL and the electrical conductor islands 21 in regions other than the respective intersections even in a case where the source line SL broken above or near the intersections is repaired, thereby making it possible to avoid a case in which a leakage between the source line SL and the gate line GL or the storage capacitance line CSL is caused by carrying out the laser welding at the intersections.

Further, the present example is configured such that a pixel electrode and neither a source line SL nor a gate line GL face each other in their film thickness directions. This causes a capacitor less likely to be constituted by the pixel electrode 33 and the source line SL or the gate line GL, so that an interlayer insulating film 32 as shown in each of FIGS. 5 and 6 may not be provided.

EXAMPLE 5

Figure 10:
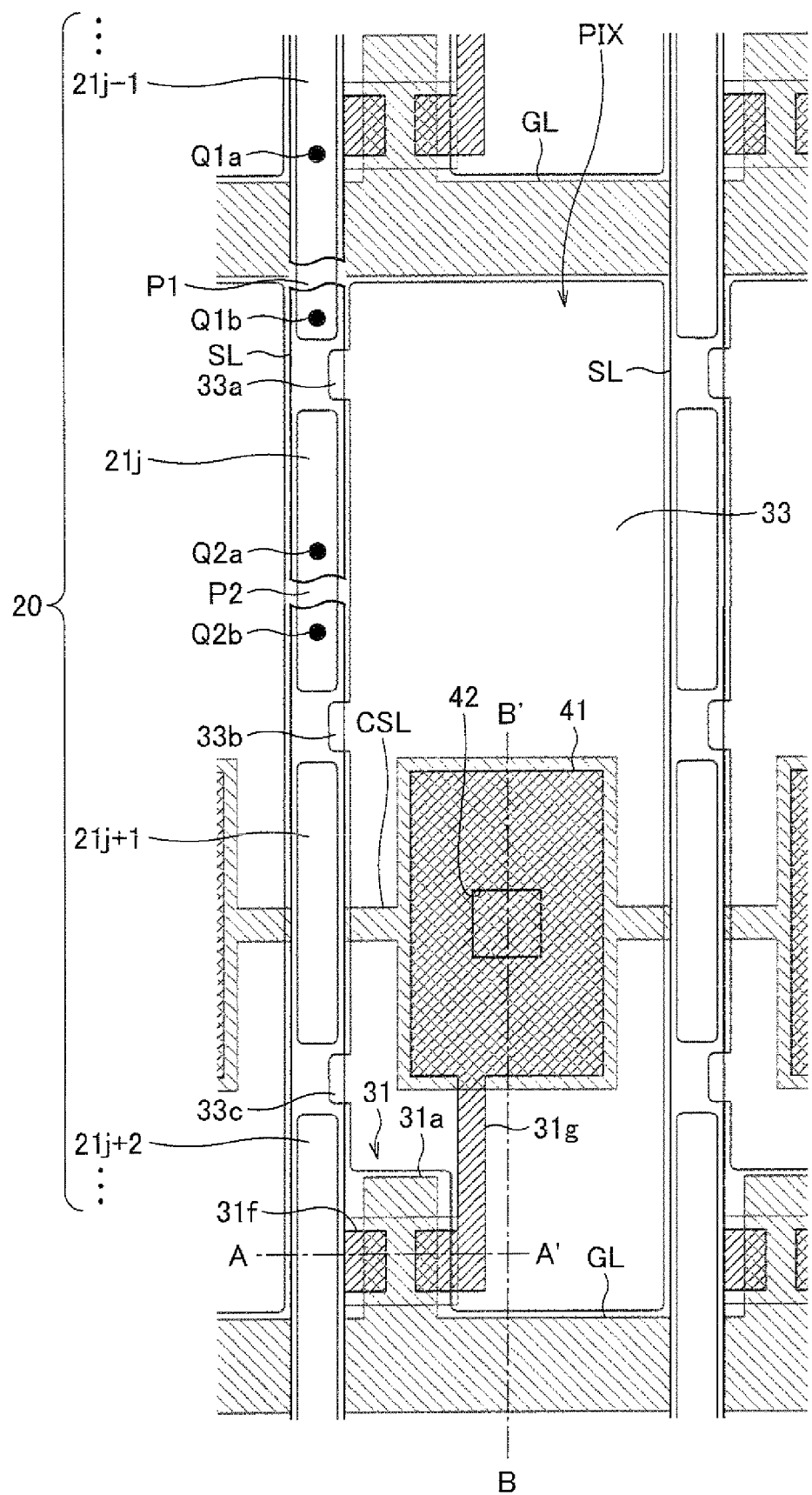
FIG. 10 is a plane view of the embodiment of the present invention, showing a fifth configuration of the pixel of the display panel.

FIG. 10 is a plane view of a pixel of a present example. Members given same reference numerals as in Example 4 have same functions as in Example 4 unless otherwise noted.

The pixel shown in FIG. 10 is configured in a same way as a pixel shown in FIG. 9 except in that a part of a pixel electrode 33, provided next to electrical conductor patterns 21, is extended from a display element side, i.e., an aperture region, so that the extended part and a gap between adjacent ones of the electrical conductor islands 21 face each other in their film thickness direction. In this case, parts 33*a*, 33*b*, and 33*b*, each being extended from an edge of the pixel electrode 33 toward a space above a source line SL in a film thickness direction, are provided above a gap between electrical conductor islands 21*j*−1 and 21*j*, a gap between electrical conductor islands 21*j* and 21*j*+1, and a gap between electrical conductor islands 21*j*+1 and 21*j*+2, respectively. The pixel electrode 33 having such an extended part may be either one of pixel electrodes that are provided on respective sides of the source line SL.

Such a configuration brings about an advantage, in addition to an effect brought about by Example 4, in that when a display panel 1 is viewed from a backside (from a glass substrate 30), that part of the pixel electrode 33 which is extended toward the source line SL is checked so that a position of each of the electrical conductor islands 21 provided behind the source line SL can be detected.

Note that the extended part of the pixel electrode and the source line SL face each other in their film thickness direction by a small portion so that, as in the case of the Example 4, the configuration of the present example does not need to include an interlayer insulating film 32.

EXAMPLE 6

Figure 11:
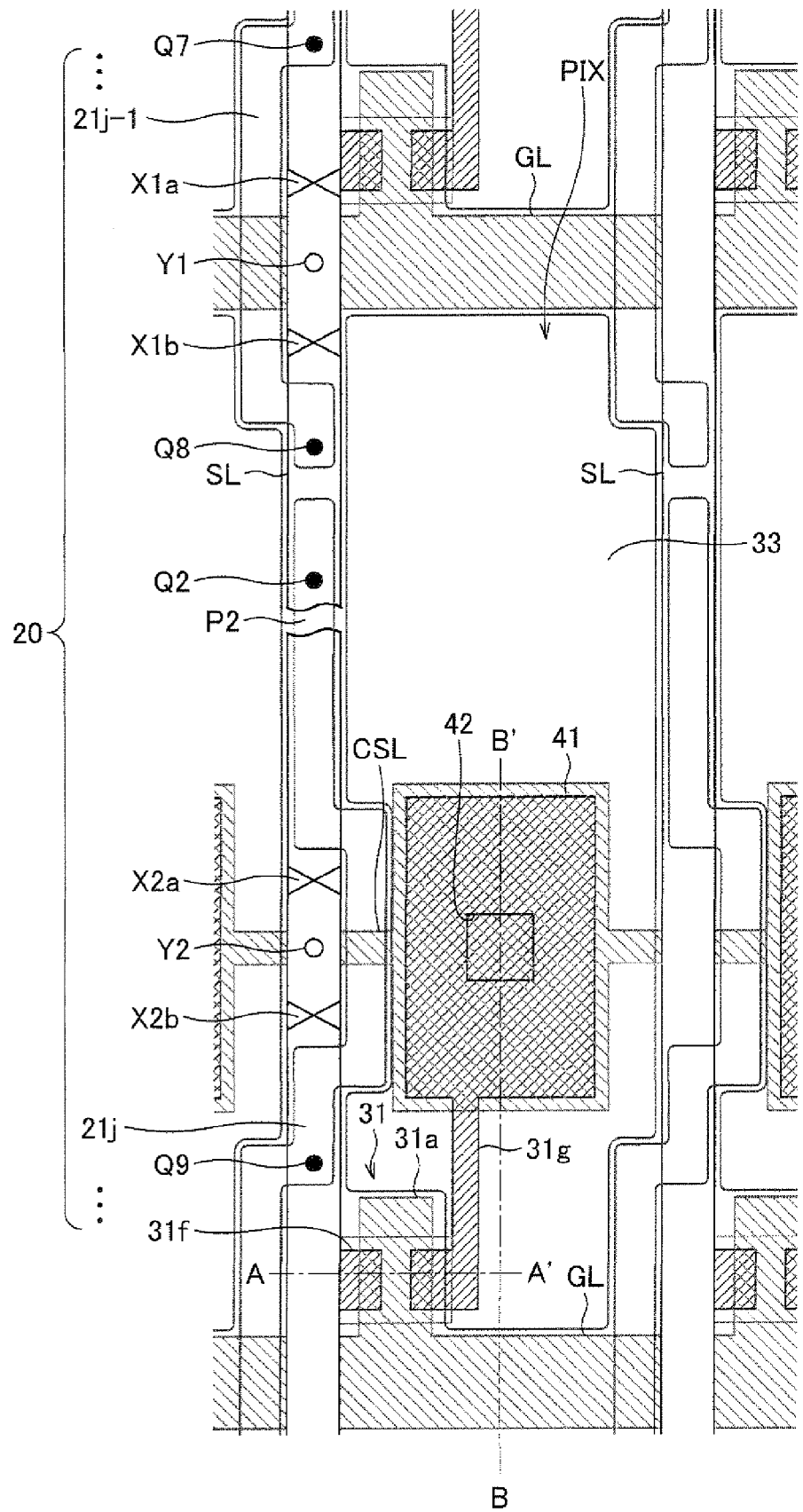
FIG. 11 is a plane view of the embodiment of the present invention, showing a sixth configuration of the pixel of the display panel.

FIG. 11 is a plane view of a pixel of present example. Members given same reference numerals as in Example 1 have same functions as in Example 1 unless otherwise noted.

An electrical conductor pattern 20 in FIG. 11 is constituted by (i) an electrical conductor island 21 going over a gate line GL in a region where the electrical conductor island 21 and a source line SL do not face each other in their film thickness direction, and (ii) an electrical conductor island 21 going over a storage capacitance line CSL in a region where the electrical conductor island 21 and the source line SL do not face each other in tier film thickness direction. In this case, an electrical conductor island 21*j*−1 is provided in a crank manner, so that the electrical conductor island 21*j*−1 (i) is bended from a region, where the electrical conductor island 21*j*−1 and the source line SL face each other in their film thickness direction, toward a region opposite to a TFT 31, where the electrical conductor island 21*j*−1 and the source line SL do not face each other in their film thickness direction, and (ii) goes over the gate line GL along a direction in which the source line extends, in the region where the electrical conductor island 21 and the source line SL do not face each other in their film thickness direction. Also, an electrical conductor island 21*j* is provided in a crank manner, so that the electrical conductor island 21*j* is (i) bended from a region, where the electrical conductor island 21*j* and the source line SL face each other in their film thickness direction, toward a region within a corresponding pixel PIX, in which region the electrical conductor island 21*j* and the source line SL do not face each other in the film thickness direction, and (ii) goes over the storage capacitance line CSL along the direction in which the source line SL extends, in the region where the electrical conductor island 21*j* and the source line SL do not face each other in the film thickness direction.

With such a configuration, it is possible that in a case where a leakage between the source line SL and the gate line GL is occurred at a point Y1 above an intersection of those wiring lines, as shown in FIG. 11, the source line SL be melted down and thereby cut at points X1*a* and X1*b* on both sides of the point Y1 by carrying out laser irradiation, the X1*a* and X1*b* in regions other than the intersection, respectively, so as to separate a part of the source line SL where the leakage is occurred. This makes it possible to solve the leakage between the source line SL and the gate line GL. It is to be noted that the point X1*a*, one of the points at which the source line SL can be melted down and cut by the laser irradiation, is between (i) the gate line GL and (ii) the connecting part of the source line SL and a TFT 31 of the pixel PIX corresponding to the gate line GL, such that the TFT 31 and the source line SL remain connected with each other. Subsequently, the electrical conductor island 21*j*–1 and the source line SL are laser welded to each other at two points Q7 and Q8, the Q7 and Q8 being (i) points at which the electrical conductor islands 21*j*–1 and the source line SL face each other in their film thickness direction, respectively, and (ii) points between which the X1*a* and X1*b* are sandwiched. This makes it possible that a data signal be normally supplied via the source line SL from which a part, where the leakage is occurred, is separated.

Further, with the configuration, it is possible that in a case where a leakage between the source line SL and the storage capacitance line CSL is occurred at a point Y2 formed above an intersection of those wiring lines, as shown in FIG. 11, the source line SL be melted down and thereby cut through at points X2*a* and X2*b* on both sides of the point Y2 by laser irradiation, the X2*a* and X2*b* being in regions other than the intersection, respectively, so as to separate a part of the source line SL where the leakage is occurred. This makes it possible to solve the leakage between the source line LS and the storage capacitance line CSL. Subsequently, the electrical conductor island 21*j* and the source line SL are laser welded to each other at two points Q2 and Q9, the Q2 and Q9 being (i) points at which the electrical conductor island 21*j* and the source line SL face each other in their film thickness direction, respectively, and (ii) points between which points X2*a* and X2*b* are sandwiched. This makes it possible that a data signal be normally supplied via the source line SL from which a leakage part is separated. It is to be noted that the point Q2 is also a point at which a breaking part P2 of the source line SL is repaired.

Further, the present example is configured such that a pixel electrode 33 and neither the source lien SL nor the gate line GL face each other in their film thickness direction. This causes a capacitor less likely to be constituted by the pixel electrode 33 and the source line SL or the gate line GL. As such, an interlayer insulating film 32 shown in each of FIGS. 5 and 6 does not need to be provided in a pixel PIX.

Further, the configuration in which the electrical conductor pattern 21 goes over the gate line GL and the storage capacitance line CSL in a region where the electrical conductor pattern 21 and the source line SL face each other in their film thickness direction is applicable to an electrical conductor pattern 20 constituted by a continuous wiring line that is not isolatable into plural electrical conductor islands 21.

EXAMPLE 7

Figure 12:
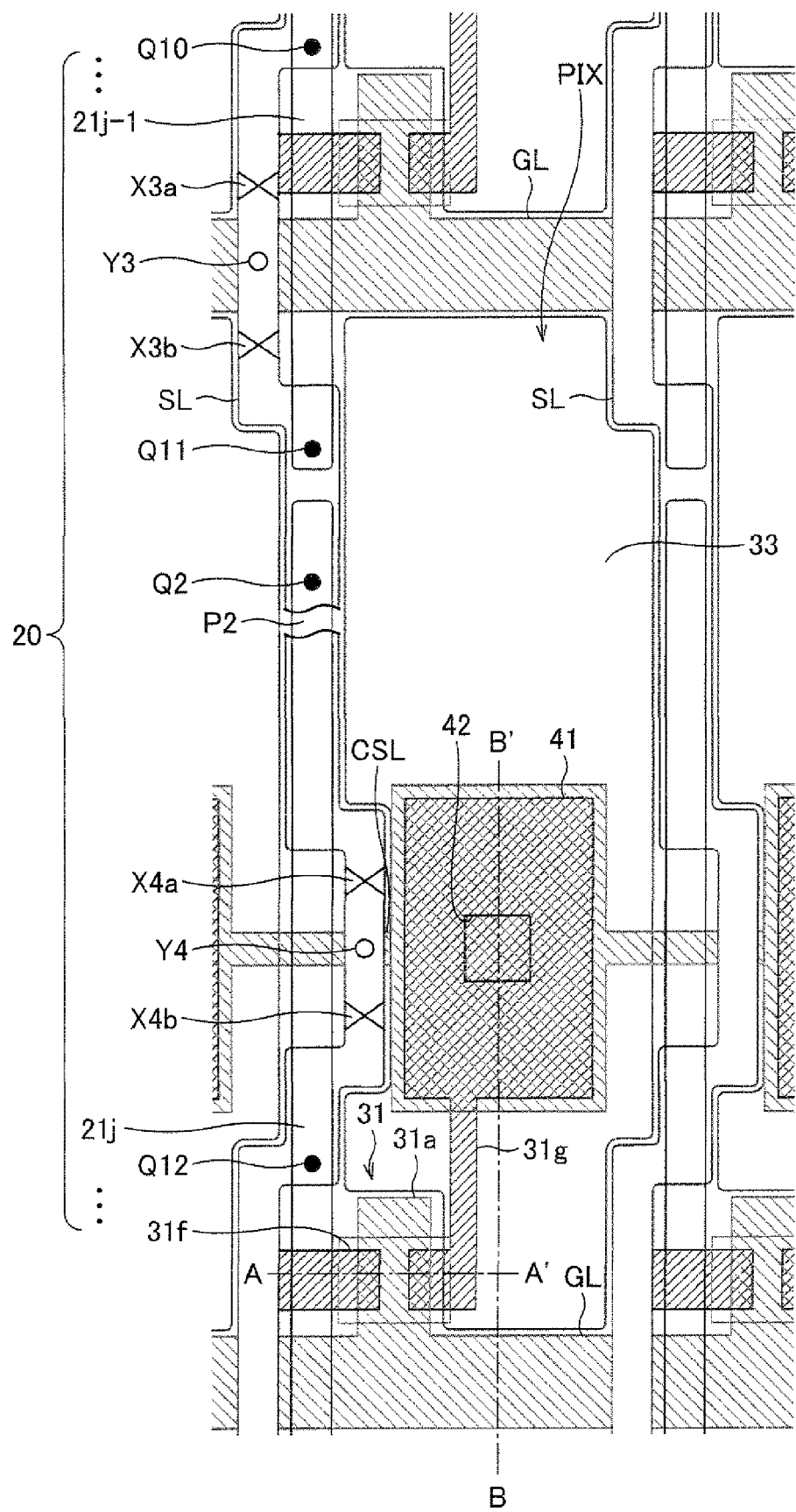
FIG. 12 is a plane view of the embodiment of the present invention, showing a seventh configuration of the pixel of the display panel.

FIG. 12 is a plane view of a pixel of a present example. Members given same reference numerals as in Example 1 have same functions as in Example 1 unless otherwise noted.

In a pixel PIX shown in FIG. 12, it is configured such that an electrical conductor pattern 20 goes over a gate line GL and a storage capacitance line CSL in regions, respectively, in neither of which the electrical conductor pattern 20 and a source line SL overlap each other in their film thickness direction. A part of the source line SL is configured in a crank manner in a region where the source line SL goes over the gate line GL, and another part of the source line SL is configured in a crank manner in a region where the source line SL goes over the storage capacitance line CSL. The electrical conductor pattern 20 is constituted by a plurality of electrical conductor islands 21 that are linearly aligned along a direction orthogonal to a direction in which the gate line GL extends. Each of the electrical conductor islands 21 goes over an intersection of the source line SL and the gate line GL and an intersection of the source line SL and the storage capacitance line CSL. In FIG. 12, a part of the source line SL is configured in the crank manner in the region where the source line SL goes over the gate line GL, such that the source line SL (i) is bent from one region, where the source line SL and a electrical conductor island 21 face each other in the film thickness direction, to another region, where the source line SL is provided opposite to a TFT 31 via the electrical conductor pattern 20 and where the source line SL and the electrical conductor island 21 do not face each other in the film thickness direction, and (ii) goes over the gate line GL in the region where the source line SL and the electrical conductor island 21 face each other in the film thickness direction. Also, another part of the source line SL is configured in the crank manner in the region where the source line SL goes over the storage capacitance line CSL, such that the source line SL (i) is bent from one region, where the source line SL and an electrical conductor island 21 face each other in their film thickness direction, to another region in a corresponding pixel PIX, in which region the source line SL and the electrical conductor island 21 do not face each other in their film thickness direction, and (ii) goes over the storage capacitance line CSL.

Such a configuration makes it possible to solve a leakage between the source line SL and the gate line GL in a case where the leakage is occurred at a point Y3 above an intersection of those wiring lines. As shown in FIG. 12, in such a case, the source line SL can be melted down and thereby cut through at points X3*a* and X3*b* on both sides of the point Y3 by laser irradiation so as to separate a leakage part of the source line SL. It is to be noted that the points X3*a* and X3*b* are in regions other than the intersection, respectively. The X3*a*, one of the points at which the source line SL can be melted down and thereby cut through by laser irradiation, is between (i) the gate line GL and (ii) a connecting part that connects the source line SL and a TFT 31 of a pixel PIX corresponding to the gate line GL. This secures the connection of the source linen SL and the TFT 31. Subsequently, the source line SL and an electrical conductor island 21*j*–1 are laser welded to each other via two points Q10 and Q11, so that a data signal can be normally supplied via the source line SL from which the leakage part is separated. It is to be noted that the Q10 and Q11 are a set of points (i) at which the source line SL and the electrical conductor island 21*j*–1 face each other in the film thickness direction and between which the points X3*a* and X3*b* are sandwiched.

Also, such a configuration makes it possible to solve a leakage between the source line SL and the storage capacitance line CSL in a case where the leakage is occurred at a point Y4 above an intersection of those wiring lines. As shown in FIG. 12, in such a case, the source line SL can be melted down and thereby cut through at points X4*a* and X4*b* on both sides of the Y4 by laser irradiation so as to separate a leakage part of the source line SL. It is to be noted that the X4*a* and X4*b* are in regions other than the intersection of the source line SL and the storage capacitance line CSL. Subsequently, the source line SL and an electrical conductor pattern 21*j* are laser welded to each other via two points Q2 and Q12 on both sides of a set of points X4a and X4b, the Q2 and Q12 being points at which the source line SL and the electrical conductor island 21j face each other in their film thickness direction. This allows normal supply of a data signal via the source line SL from which the leak part is separated. It is to be noted that the Q2 is also a point at which the source line SL and the electrical conductor island 21j can be laser welded with each other for repairing a breaking part P2.

Further, the present example is configured such that a pixel electrode 33 and neither the source line SL nor the gate line GL face each other in their film thickness direction. This causes a capacitor less likely to be constituted by the pixel electrode 33 and the source line SL or the gate line GL. In view of this, an interlayer insulating film 32 as shown in each of FIGS. 5 and 6 does not need to be provided in a pixel PIX.

The present example is configured such that a part of the source line SL is provided in a crank manner, so that even in a case where a pattern defect in a photo resist is occurred during a lithography process, normal supply of a data signal is made possible by laser welding an electrical conductor island 21 and the source line SL with each other.

Figure 13:
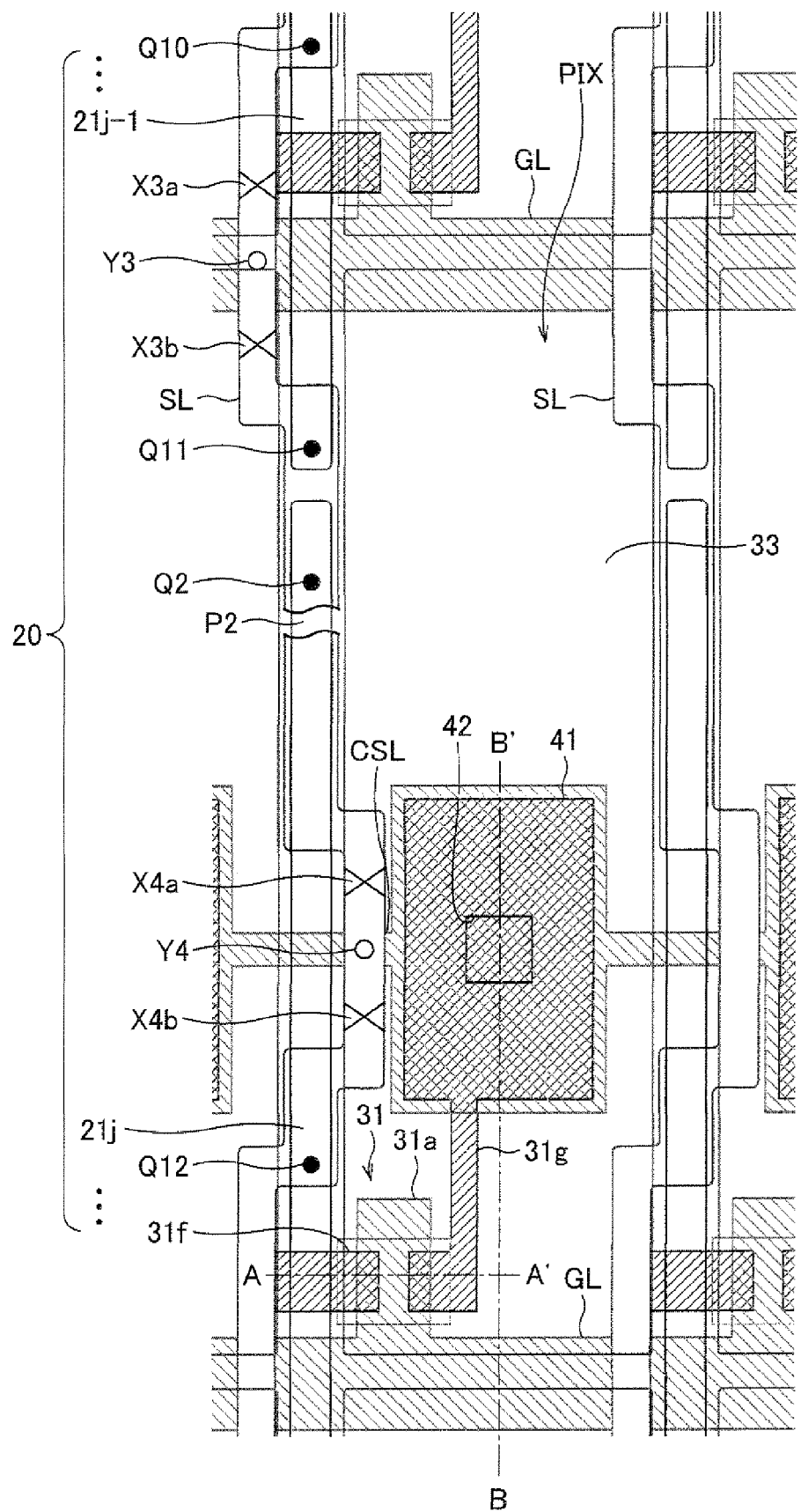
FIG. 13 is a plane view of the embodiment of the present invention, showing a configuration of a modified example of the pixel of the display panel shown in FIG. 12.

Next, FIG. 13 shows a configuration of a modified example of the configuration shown in FIG. 12. A pixel PIX in FIG. 13 is same as the pixel PIX in FIG. 12 in terms that a pixel electrode 33 and a source line SL, except a part provided in a crank manner, do not face each other in their film thickness direction, whereas the pixel PIX in FIG. 13 is different from the pixel PIX in FIG. 12 in terms that the pixel electrode 33 and a gate line GL overlap each other as in FIG. 1.

EXAMPLE 8

Figure 14:
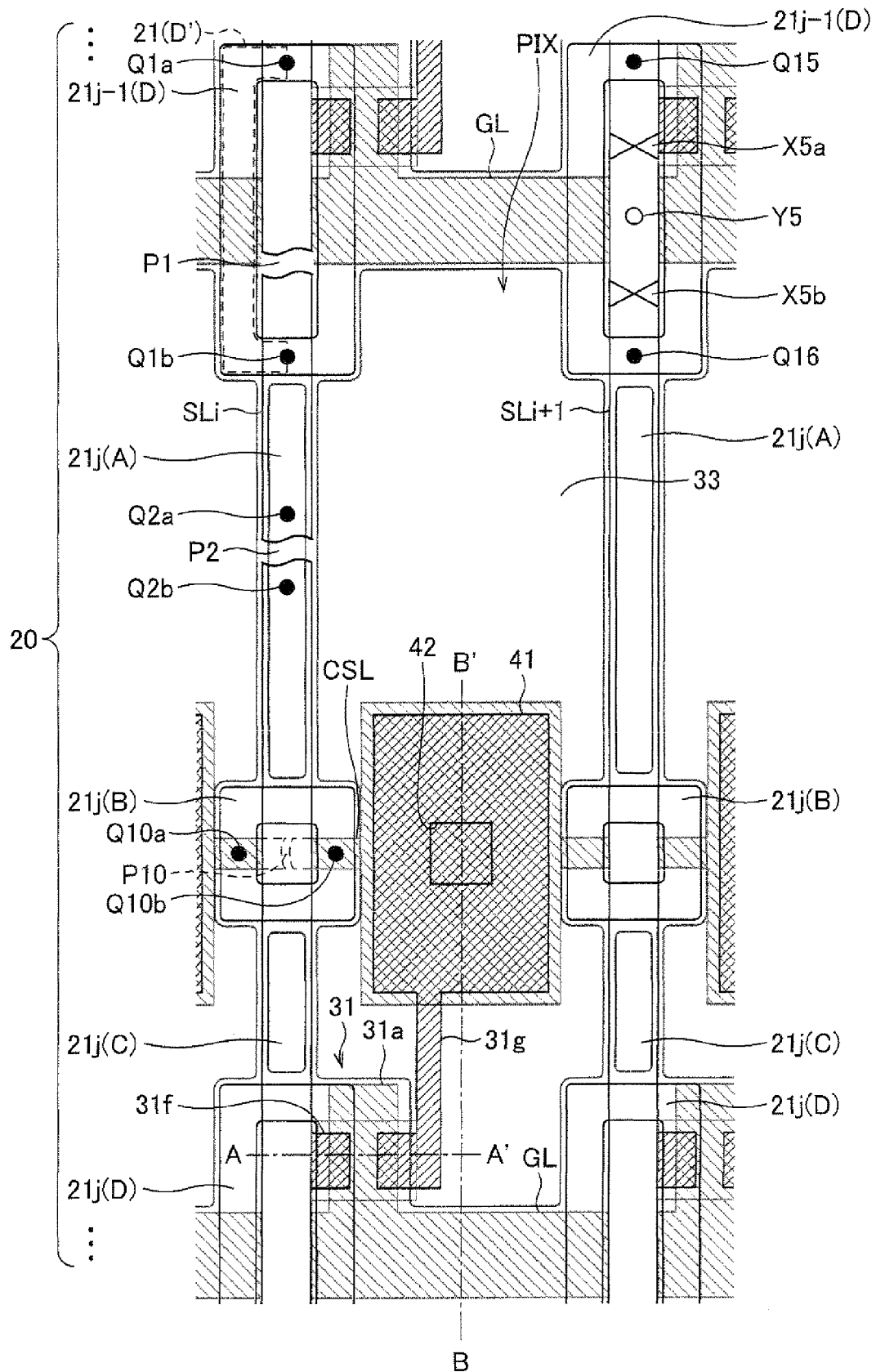
FIG. 14 is a plane view of the embodiment of the present invention, showing an eighth configuration of the pixel of the display panel.

FIG. 14 is a plane view of a pixel of a present example. Members given same reference numerals as in Example 1 have same functions as in Example 1 unless otherwise noted.

An electrical conductor pattern 20 is constituted by downsized electrical conductor islands 21, a plurality of which electrical conductor islands are provided for one pixel. For an intersection of a source line and a gate line GL, a ring shaped one of the electrical conductor islands 21 is provided so as to surround the intersection, and for an intersection of the source line SL and a storage capacitance line CSL, a ring shaped one of electrical conductor islands 21 is provided so as to surround the intersection. In this case, the electrical conductor paten 20 is configured such that four types of electrical conductor islands 21(A) through 21(D) are provided for one pixel, where the electrical conductor island 21(B) is a ring-shaped one of the electrical conductor islands, which surrounds the intersection of the source line SL and the storage capacitance line CSL, and the electrical conductor island 21(D) is a ring shaped one of the electrical conductor islands, which surrounds the intersection of the source line SL and the gate line GL. Also, the electrical conductor island 21(B) surrounds a region, which corresponds to a part of the source line on both sides of the intersection of the source line SL and the storage capacitance line CSL, to such an extent as to allow the source line SL to be melted down and thereby cut through by laser irradiation. The electrical conductor island 21(D) surrounds a region, which corresponds to a part of the source line on both sides of the intersection of the source line SL and the gate line GL, to such an extent as to allow the source line SL to be melted down and thereby cut through by laser irradiation. A part connecting the source line SL and a TFT 31 of a pixel PIX corresponding to the gate line GL is also in a region that corresponds to the region surrounded by the electrical conductor island 21(D). On the other hand, the electrical conductor islands 21(A) and 21(C) are linearly aligned along a direction in which a pixel column extends.

In FIG. 14, for example, in a case where breaking of a source line SLi is occurred at a point P1 in a region surrounded by a ring-shaped electrical conductor island 21j–1 (D), the source line SLi and the electrical conductor island 21j–1(D) can be laser welded with each other via two points Q1a and Q1b on both sides of the point P1, thereby allowing normal supply of a data signal via the source line SLi. It is to be noted that the Q1a and Q1b are points at which the source line SLi and the electrical conductor island 21j–1(D) face each other in their film thickness direction. On the other hand, in a case where breaking of the source line SLi is occurred at a point P2 in a region where the source line SLi and an electrical conductor island 21j(A) face each other in their film thickness direction, the source line SLi and the electrical conductor island 21j(A) should be laser welded to each other via two points Q2a and Q2b in a same ways as in FIG. 1.

Furthermore, in a case where, for example, breaking of the storage capacitance line CSL is occurred at a point P10 in a region surrounded by a ring shaped one of the electrical conductor island 21j(B), the electrical conductor island 21j (B) and the storage capacitance line CSL should be laser welded to each other via two points Q10a and Q10b on both sides of the P10, so that the breaking of the storage capacitance line CSL is repaired by the electrical conductor island 211(B). Similarly, in a case where breaking of the gate line GL is occurred at a point in a region corresponding to that surrounded by a ring shaped one of the electrical conductor islands 21(D), the breaking of the gate line GL can be repaired by use of the electrical conductor island 21(D).

Further, in a case where, for example, a leakage between a source line SLi+1 and the gate line GL is occurred at a point Y5 in an intersection of those wiring lines, the source line SLi+1 should be melted down and thereby cut through at points X5a and X5b on both sides of the Y5 by laser irradiation so as to separate a leakage part of the source line SLi+1, where the X5a and XS5b are in a part of a region surrounded by an electrical conductor island 21j–1(D), which part is other than the intersection of the source line SLi+1 and the gate line GL. This makes it possible to solve the leakage between the source line SLi+1 and the gate line GL. It is to be noted that the X5, one of the points at which the source line SLi+1 is melted down and thereby cut through by the laser irradiation, is between (i) the gate line GL and (ii) a connecting part of the source line SLi+1 and a TFT 31 of a pixel PIX corresponding to the gate line GL, so that connection of the source line SLi+1 and the TFT 31 is maintained. Subsequently, the electrical conductor island 21j–1(D) and the source line SL+1 are laser welded to each other via two points Q15 and Q16 on both sides of a set of the points X5a and X5b, at each of which points Q15 and Q16 the electrical conductor island 21j–1(D) and the source line SLi+1 face each other in their film thickness direction. This allows normal supply of a data signal via the source line SLi+1 from which the leakage part is separated. Similarly, in a case where a leakage between the source line SL and the storage capacitance line CSL is occurred at a point in an intersection of those wiring lines, a leakage part of the source line SL should be separated, and then, an electrical conductor island 21(D) and the source line SL should be laser welded to each other. This allows normal supply of a data signal via the source line SL.

Furthermore, the present example is configured such that a pixel electrode 33 and neither the source line SL nor the gate line GL face each other in their film thickness direction. This causes a capacitor less likely to be constituted by the pixel electrode 33 and the source line SL or the gate line GL. In view of this, an interlayer insulating film 32 as shown in each of FIGS. 5 and 6 does not need to be provided in a pixel PIX. However, it is to be noted that provision of the interlayer insulating film 32 makes it possible to reduce dielectric field influence on a TFT element. In contrast, in a case where no interlayer insulating film 32 is provided, an electrical conductor island 21(D) should be provided such that a half part of the ring shaped electrical conductor island 21(D), the half part provided in an adjacent pixel column side with respect to the source line SL, is used, and thereby, no electrical conductor island is provided above a TFT 31. In a case where no interlayer insulating film 32 is provided, only a half of a ring shaped electrical conductor island 21(D), which half is a part provided above an adjacent pixel column, should be used. As such, an electrical conductor island 21(D') shown by a dash line in FIG. 14 is provided, so that no electrical conductor island is provided above a TFT 31.

Each of the examples has been described hereinabove.

Each of the electrical conductor patterns 20, shown in FIGS. 1 through 3 and 9 through 14, is patterned in a process step independent from a process step in which the source line SL is patterned. In view of this, is a probability that an electrical conductor pattern 20 breaks near a part corresponding to a breaking part of the source line SL is low. Thus, there does not emerges any of problems in that, as in a conventional case, a part of a spare line for bypassing a breaking part of a data signal line breaks at the same time as the data signal breaks, thereby lowering a probability that a supply failure of a data signal can be avoidable. Further, because an electrical conductor pattern 20 can be made of a same material as an electrode of a display element of a pixel, such as a pixel electrode 33, complication of a process can be avoided.

As is clear form the above, the display panel 1 is a display panel configured such that a spare line is provided for each source line SL, in which display panel it is possible to increase a probability that a supply failure of a data signal can be avoided, even in the event of breaking of the source line SL. Further, because the electrical conductor pattern 20 and a corresponding source line SL are provided so as to be connected with a same pixel, their electric potentials can be same with each other. A such, even in a case where a leakage between the electrical conductor pattern 20 and a corresponding source line SL is occurred, it is possible that an electric potential of a pixel connected with another source line SL be free from influence by the leakage. Also, because the electrical conductor pattern 20 is provided such that the electrical conductor pattern 20 and the source line SL face each other in their film thickness direction, it is possible to prevent provision of spare lines from reducing an aperture rate of a pixel.

Further, as in Examples shown in FIGS. 1 through 3 and 9 through 14, in a case where the electrical conductor pattern 20 is made of a transparent electrode, it is easier to observe a breaking part of the source line SL from the electrical conductor pattern 20. Besides, the electrical conductor pattern 20 made of the transparent electrode is favorable in a case where it is desired not to block a transmission light, e.g., a case where it is intended to prevent an intended reflection in a space above the source line SL.

Further, even though in Examples shown in FIGS. 1 through 3 and 9 through 14, the electrical conductor pattern 20 is provided above the source line SL so that the electrical conductor pattern 20 and the source line SL face each other in their film thickness direction, a configuration of the electrical conductor pattern 20 is not limited to this. Alternatively, the electrical conductor pattern 20 can be provided below the source line SL so that the electrical conductor pattern 20 and the source line SL face each other in the film thickness direction. In this case, the electrical conductor pattern 20 can be provided below the gate line GL in the film thickness direction in a case where (i) patterning of the electrical conductor pattern 20 above the gate line GL causes breaking of the source line SL more likely to be occurred or (ii) connection of the gate line GL and a TFT 31 and connection of the source line SL and the TFT 31 are made at heights, respectively, that are remarkably different from each other, thereby making it harder to secure the connections.

Further, the display panel can be configured such that each end of the source line SL is connected with a source driver.

Thus, the above description explains the present embodiment. By configuring a display device including a display panel in accordance with any of the embodiments, it is possible to manufacture a display device, which includes a display panel having less pixel illumination failure, at a high yield rate.

It is to be noted that neither a display panel nor a display device is limited in a display element. Examples of a display element for use in the display panel or the display device include, besides a liquid crystal, an organic electroluminescent element, or a dielectric liquid, an electrochromic material.

The present invention is not limited to the description of the embodiment above, but may be altered by a skilled person within the scope of the claims. An embodiment based on a proper combination of technical means altered as appropriate within the scope of the claims is encompassed in the technical scope of the present invention.

The display panel of the present invention is, as described above, an active matrix display panel, which includes electrical conductor patterns in each of which a plurality of electrical conductor islands are provided so as to line up, each of the plurality of electrical conductor islands partially or entirely facing corresponding one of data signal lines in its film thickness direction, the electrical conductor patterns being provided for the respective data signal lines and being different from a pattern of electrodes of display elements to which respective data signals are supplied.

Furthermore, the display panel of the present invention is, as described above, an active matrix display panel, which includes electrical conductor patterns in each of which a wiring line is provided so as to partially face a corresponding one of data signal lines in its film thickness direction, the electrical conductor patterns being provided for the respective data signal lines Therefore, it is possible to realize the display panel including a spare line for a data signal line, in which display panel it is possible to increase a probability that supply failure of a data signal can be avoided, even in a case where breaking of the data signal line is occurred.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is particularly suitably usable in a liquid crystal display device including a large and high definition screen, in which liquid crystal display device breaking of a wiring line becomes more likely to be occurred.

The invention claimed is:

1. An active matrix display panel, comprising:
electrical conductor patterns in each of which a plurality of electrical conductor islands are provided so as to line up, each of the plurality of electrical conductor islands partially or entirely facing corresponding one of data signal lines in its film thickness direction,
said electrical conductor patterns being provided for the respective data signal lines and being different from a pattern of electrodes of display elements to which respective data signals are supplied,
wherein, in each of the electrical conductor patterns, an electrode pattern of an adjacent display element extends from a side of the display element to a gap between adjacent ones of the plurality of electrical conductor islands.

2. The display panel as set forth in claim 1, wherein each of the plurality of electrical conductor islands has a length in a direction in which a pixel column extends, the pixel column being constituted by pixels each connected with a same data signal line, the length being smaller than or equal to a length of one pixel in the direction.

3. The display panel as set forth in claim 1, wherein, in each of the electrical conductor patterns, (i) and (ii) face each other as follows: (i) a gap between adjacent ones of the plurality of electrical conductor islands and (ii) a connecting part of the corresponding one of data signal lines and a corresponding pixel selection element.

4. The display panel as set forth in claim 1, wherein
an electrical conductor island in each one of the electrical conductor patterns goes over each one of intersections of the data signal lines and scanning signal lines, and
the electrical conductor island in each one of the electrical conductor patterns partially faces both sides of corresponding one of the data signal lines, the each one of intersections being sandwiched between the both sides.

5. The display panel as set forth in claim 1, further comprising storage capacitance lines so that storage capacitance is provided for respective pixels, the storage capacitance lines being provided so as to intersect with the respective data signal lines,
an electrical conductor island in each one of the electrical conductor patterns going over each one of intersections of the data signal lines and the storage capacitance lines, and the electrical conductor island in each one of the electrical conductor patterns partially facing both sides of corresponding one of the data signal lines, the each one of intersections being sandwiched between the both sides.

6. The display panel as set forth in claim 1, wherein
each one of the electrical conductor patterns comprises an electrical conductor island which is connected with corresponding one of the data signal lines via a plurality of connecting parts,
the corresponding one of the data signal lines being broken between adjacent ones of the plurality of connecting parts.

7. The display panel as set forth in claim 1, wherein more than one of the plurality of electrical conductor islands are provided in a direction in which a pixel column extends, so as to line up within a distance corresponding to a length of one pixel in the direction in which the pixel column extends, the pixel column being constituted by pixels each connected with a same data signal line.

8. The display panel as set forth in claim 1, wherein each one of the electrical conductor patterns is made by a transparent electrode.

9. A display device comprising a display panel as set forth in claim 1.

10. A method for manufacturing a display panel as set forth in claim 1,
the method comprising the step of forming the electrical conductor patterns from a same material as the electrodes of the display elements to which the respective data signals are supplied, by concurrently patterning the electrical conductor patterns and the electrodes of the display elements.

11. The method as set forth in claim 10, wherein the display panel is a liquid crystal display panel, and the electrodes are pixel electrodes.

12. The method as set forth in claim 10, further comprising the step of forming a path that causes the data signals to be supplied via the respective electrical conductor patterns, by carrying out laser welding so that the electrical conductor patterns are connected with the respective data signal lines.

* * * * *